United States Patent
Arai et al.

(10) Patent No.: US 6,840,628 B2
(45) Date of Patent: Jan. 11, 2005

(54) COOLER FOR ELECTRO OPTIC DEVICE AND PROJECTOR

(75) Inventors: Jun Arai, Matsumoto (JP); Toshio Matsumiya, Matsumoto (JP); Mutsuya Furuhata, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/472,049

(22) PCT Filed: May 15, 2002

(86) PCT No.: PCT/JP02/04685
§ 371 (c)(1),
(2), (4) Date: Sep. 17, 2003

(87) PCT Pub. No.: WO02/093252
PCT Pub. Date: Nov. 21, 2002

(65) Prior Publication Data
US 2004/0095559 A1 May 20, 2004

(30) Foreign Application Priority Data
May 16, 2001 (JP) ........................ 2001-146508

(51) Int. Cl.$^7$ ........................... G03B 21/16; G03B 21/18
(52) U.S. Cl. ........................................... 353/58; 353/61
(58) Field of Search ............................. 353/52, 57, 58, 353/61, 119

(56) References Cited

U.S. PATENT DOCUMENTS

| | | | | |
|---|---|---|---|---|
| 3,768,546 A | * | 10/1973 | Shipes | 165/96 |
| 5,806,950 A | | 9/1998 | Gale et al. | 353/78 |
| 5,876,105 A | | 3/1999 | Rodriquez, Jr. | 353/119 |
| 6,231,191 B1 | * | 5/2001 | Shiraishi et al. | 353/61 |
| 6,290,360 B1 | * | 9/2001 | Konuma et al. | 353/61 |
| 6,402,326 B1 | * | 6/2002 | Bortz | 353/119 |
| 6,422,703 B1 | * | 7/2002 | Wang et al. | 353/61 |

FOREIGN PATENT DOCUMENTS

| | | | | |
|---|---|---|---|---|
| JP | A 61-128235 | 6/1986 | | |
| JP | U 63-78941 | 5/1988 | | |
| JP | A 7-311420 | 11/1995 | | |
| JP | A 11-52324 | 2/1999 | | |
| JP | A 11-160793 | 6/1999 | | |
| JP | A-11-160793 | 6/1999 | | |
| JP | A 2000-19646 | 1/2000 | | |
| JP | 2000194071 A | * | 7/2000 | G03B/21/16 |
| JP | A 2000-259094 | 9/2000 | | |
| JP | A 2001-13589 | 1/2001 | | |
| JP | A 2001-174920 | 6/2001 | | |
| JP | A 2001-249402 | 9/2001 | | |
| JP | A 2002-244210 | 8/2002 | | |

* cited by examiner

Primary Examiner—Christopher Mahoney
(74) Attorney, Agent, or Firm—Oliff & Berridge, PLC

(57) ABSTRACT

A panel cooling system A has a pair of Sirocco fans 51A, 51B arranged at both sides of the radial direction of a projection lens 46, a suction duct portion 52A and an exhaust duct portion 52B. The suction duct portion 52A communicates a suction port of the undersurface of an armored case 2 with a suction side of each of the Sirocco fan 51A, 51B, and the exhaust duct portion 52B communicates an exhaust side of each of the Sirocco fans 51A, 51B and color lights R, G, B of an optical part. Thereby, a cooling air is blown to the vicinity of each light incident position of the color lights R, G, B of the optical part for approximately the same air quantity, so that the cooling of the optical part is performed

18 Claims, 17 Drawing Sheets

XII CLOSE-UP

COOLER FOR ELECTRO OPTIC DEVICE AND PROJECTOR

TECHNICAL FIELD

The present invention relates to a cooler for an electro optic device and a projector. More in particular, the invention relates to a cooler for an electro optic device which modulates a light flux emitted from a light source according to image information and projects it from a projection lens and a projector comprising the cooler for the electro optic device.

BACKGROUND ART

Conventionally, for example, there has been known a projector of so-called three-panel type which synthesizes light colors modulated by an electro optic device such as liquid crystal panels according to image information, and magnifies and projects a color image through a projection lens. An optical unit of this projector separates the light flux emitted from the light source into light colors of three primary colors of Red (R), Green (G) and Blue (B) by a dichroic mirror. Further, the optical unit modulates each color light by three pieces of the liquid crystal panels, which are the electro optic device, according to the image information, and synthesizes the light fluxes thus modulated by a cross dichroic prism.

Such a conventional projector comprises an optical unit which modulates the color light by using the liquid crystal panel which is relatively weak to heat. For this reason, the conventional projector comprises a cooling fan for sending an air to the vicinity of the liquid crystal panel of the optical unit and cooling the panel in order to avoid the damage due to the heat generated from the light source.

Meanwhile, merely to provide the cooling fan in the vicinity of the liquid crystal panel of the optical unit will only lead to the bulkiness of the projector due to the cooling fan. Further, since a projection lens is cylindrical, such a projection lens will cause a dead space around this projection lens, which is a space hard to utilize effectively.

Hence, as a conventional projector, for example, a constitution described in Japanese Patent Laid-Open No. 11-160793 is known. The projector disclosed in this Japanese Patent Laid-Open No. 11-160793 provides a cooling fan adjacent to a projection lens. Further, an exhaust side of the cooling fan is provided with an exhaust duct. This exhaust duct sends an exhaust air from the cooling fan to the vicinity of the liquid crystal panel of the optical unit from below and cools the panel. Further, a circulation duct for recovering the exhaust air sent to the optical unit from the exhaust duct is disposed over the optical unit. This circulation duct sends the recovered exhaust air to a suction side of the cooling fan after being cooled at a cooling heat sink. The conventional projector disclosed in the above-described Japanese Patent Laid-Open No. 11-160793 adopts such a constitution that a space around the projection lens is effectively utilized so as to be downsized and at the same time the dust from the outside is prevented from being mixed into the interior thereof by a closed structure which circulates the exhaust air sent from the cooling fan to the optical unit.

However, since the conventional projector disclosed in the above-described Japanese Patent Laid-Open No. 11-160793 is of a closed structure, which circulates the exhaust air from the cooling fan, there is a problem in that the structure of the projector is complicated and further downsizing thereof is hard to attempt. Moreover, since the optical unit is cooled by one cooling fan, there is also a problem in that some level of the airflow is necessary to be sent to the optical unit, thereby increasing a load of the cooling fun and making it hard to attempt the reduction in the noise.

DISCLOSURE OF THE INVENTION

An object of the present invention is to make a simple structure easy to be downsized in the cooler for the electro optic device and the projector, and further to make it possible to reduce the load of a fan and reduce the noise thereof.

The cooler for the electro optic device of the present invention is a cooler for the electro optic device for cooling the electro optic device which modulates a light flux emitted from a light source according to image information and projects the light thus modulated from a projection lens, and is characterized by comprising a frame body which opens an suction port downward; a fan disposed in the interior of the frame body adjacent to a projection lens with an suction side communicated with the suction port; and a duct for blowing an exhaust air exhausted from this fan to the electro optic device.

According to such a constitution of the present invention, since an air is taken from the suction port of the undersurface of the frame body by the fan disposed adjacent to the projection lens, and the exhaust air exhausted from this fan is blown to the electro optic device through the duct so as to cool the device, the space around the projection lens is effectively utilized so as to attempt the downsizing, and at the same time because of a simple construction to simply provide a suction port in the undersurface of the frame body, the dust in the air, for example, is hard to be absorbed into the fan from the suction port so that the downsizing can be attempted without any influences caused by the dust.

Further, the cooler for the electro optic device of the present invention is a cooler for the electro optic device for cooling the electro optic device which modulates a light flux emitted from a light source according to image information and projects the light thus modulated from a projection lens, and is characterized by comprising a pair of fans disposed adjacent to the projection lens and a duct for blowing the exhaust air exhausted from these fans to the electro optic device.

According to such a constitution of the present invention, since the exhaust air from the pair of fans disposed adjacent to the projection lens is blown to the electro optic device through the duct, the space around the projection lens is effectively utilized so as to attempt the downsizing, and at the same time the air flow for cooling the electro optic device is sufficiently secured and a load of the fan is reduced so that the reduction in the noise can be attempted.

Further, in the cooler for the electro optic device of the present invention, it is preferable that a pair of fans is symmetrical in rotational directions with the projection lens as a center.

According to such a constitution, the rotational directions of a pair of fans are made symmetrical with the projection lens as a center, and it is possible to use the same fan so as to improve an assembly property.

Furthermore, it is preferable that the cooler for the electro optic device of the present invention comprises an electro optic device, a projection lens, a pair of fans and a duct, and comprises a frame body having one suction port communicating respectively with the suction sides of the pair of fans.

According to such a constitution, since the frame body disposed with the electro optic device, the projection lens, the pair of fans and the duct is provided with one suction port communicating respectively with the suction sides of the pair of fans, even if the constitution comprises a plurality of fans, it is possible to suck an air by a simple structure having one suction port, and the manufacturing property thereof is improved in contrast to the case where a plurality of suction ports are provided.

Further, in the cooler for the electro optic device of the present invention, the suction port is provided in the undersurface of the frame body.

According to such a constitution, since the suction port is provided in the undersurface of the frame body, for example, the dust in the air is hard to enter the fans from the suction port so that the downsizing can be attempted without any influences caused by the dust.

It is preferable that the cooler for the electro optic device of the present invention comprises a rectifying member which is disposed at the suction sides of the pair of fans and rectifies each airflow sucked by these fans approximately for the same quantity.

According to such a constitution, since the rectifying member for rectifying each airflow sucked by these fans approximately for the same quantity is provided at the suction sides of the pair of fans, the air is stably sucked by each fan respectively and the load of the fan is stabilized to improve the cooling efficiency and reduce the noise at the same time.

It is preferable that the cooler for the electro optic device of the present invention is provided with the frame body which faces on the suction port, and comprises a rectifying plate for rectifying each airflow sucked by the pair of fans approximately for the same quantity.

According to such a constitution, since the rectifying plate for rectifying each airflow sucked by the pair of fans approximately for the same quantity is provided so as to face on the suction port of the frame body, the air is stably sucked by the pair of fans respectively by a simple structure having the rectifying plate, and the load of the fan is stabilized to improve the cooling efficiency and reduce the noise at the same time.

It is preferable that the cooler for the electro optic device of the present invention is provided with the electro optic device in plurality, and the duct comprises a flow dividing member for blowing an exhaust air of approximately the same quantity to the plurality of electro optic devices respectively.

According to such a constitution, since the flow dividing member for blowing the exhaust air of approximately the same quantity to a plurality of electro optic devices respectively is provided to the duct, the electro optic devices are stabilized and cooled evenly.

It is preferable that the cooler for the electro optic device of the present invention is provided with the electro optic devices in three types, and comprises a flow dividing member which is provided on the duct blows two third of the air flow of the exhaust air exhausted from the pair of fans respectively to two different electro optic devices respectively from among the above-described electro optic devices and unifies a remainder of the air flow of the exhaust air exhausted from the fans so as to blow it to the other electro optic device from among the above-described electro optic devices.

According to such a constitution, since the duct is provided with the flow dividing member which blows two third of the exhaust air exhausted from the pair of fans respectively to two different electro optic devices respectively from among three types of the electro optic devices and blows the remainder of the exhaust air which is unified to the other electro optic device, the electro optic devices are stabilized and cooled evenly.

The projector of the present invention is characterized by comprising an electro optic device for modulating a light flux emitted from a light source according to image information; a projection lens for projecting the light flux modulated by this electro optic device; and the above-described cooler for the electro optic device of the present invention.

According to such a constitution of the present invention, since the invention comprises the above-described cooler for the electro optic device, the downsizing can be attempted by a simple structure, and the reduction in the noise can be attempted by the reduction in the load of the fan.

BEST MODE FOR CARRYING OUT THE INVENTION

Hereinafter, one embodiment of the present invention will be described with reference to the drawings.

[1. Main Structure of the Projector]

Figure 1:
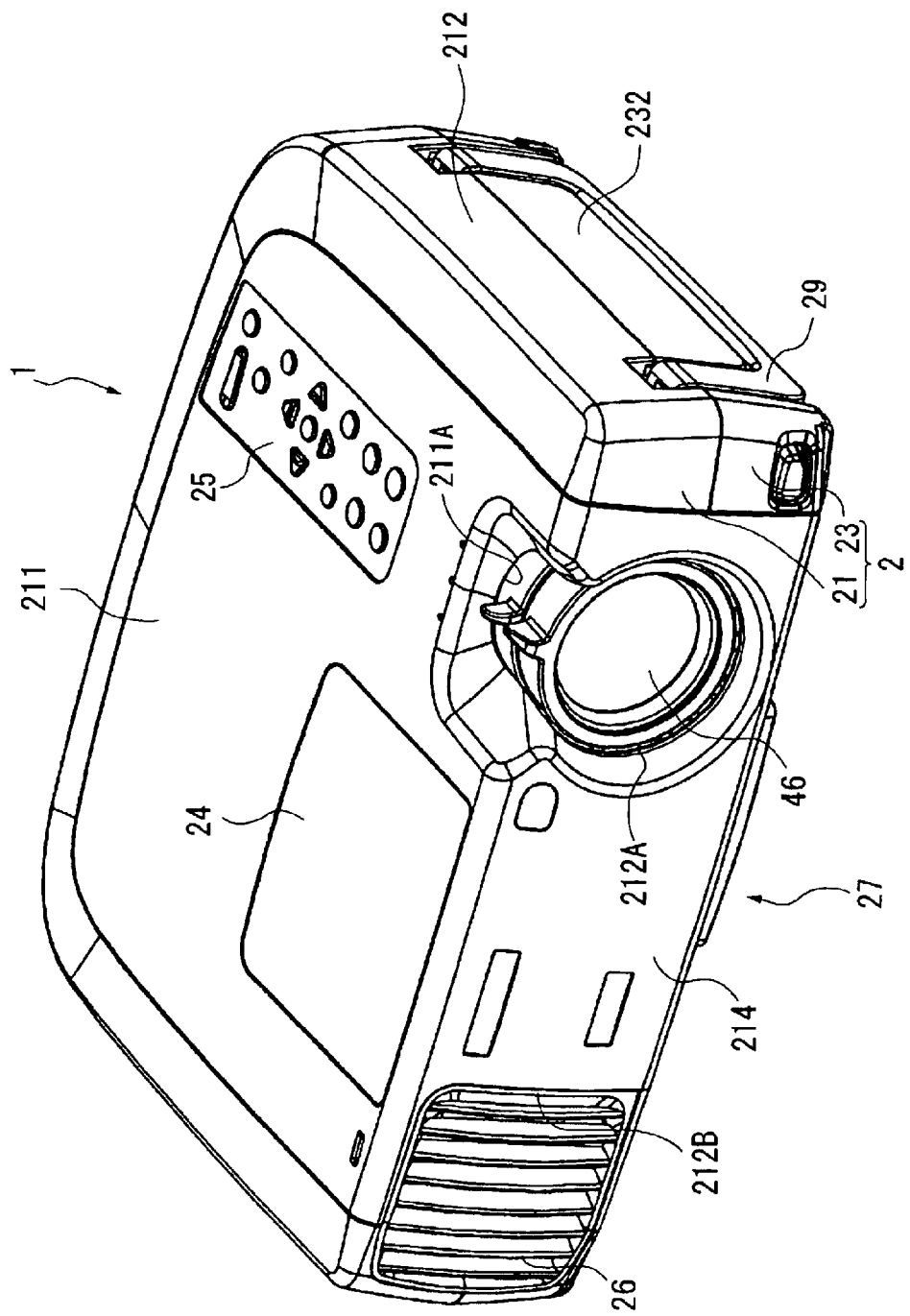
FIG. 1 is an overall perspective view seen from above of a projector according to one embodiment of the present invention.
Figure 2:
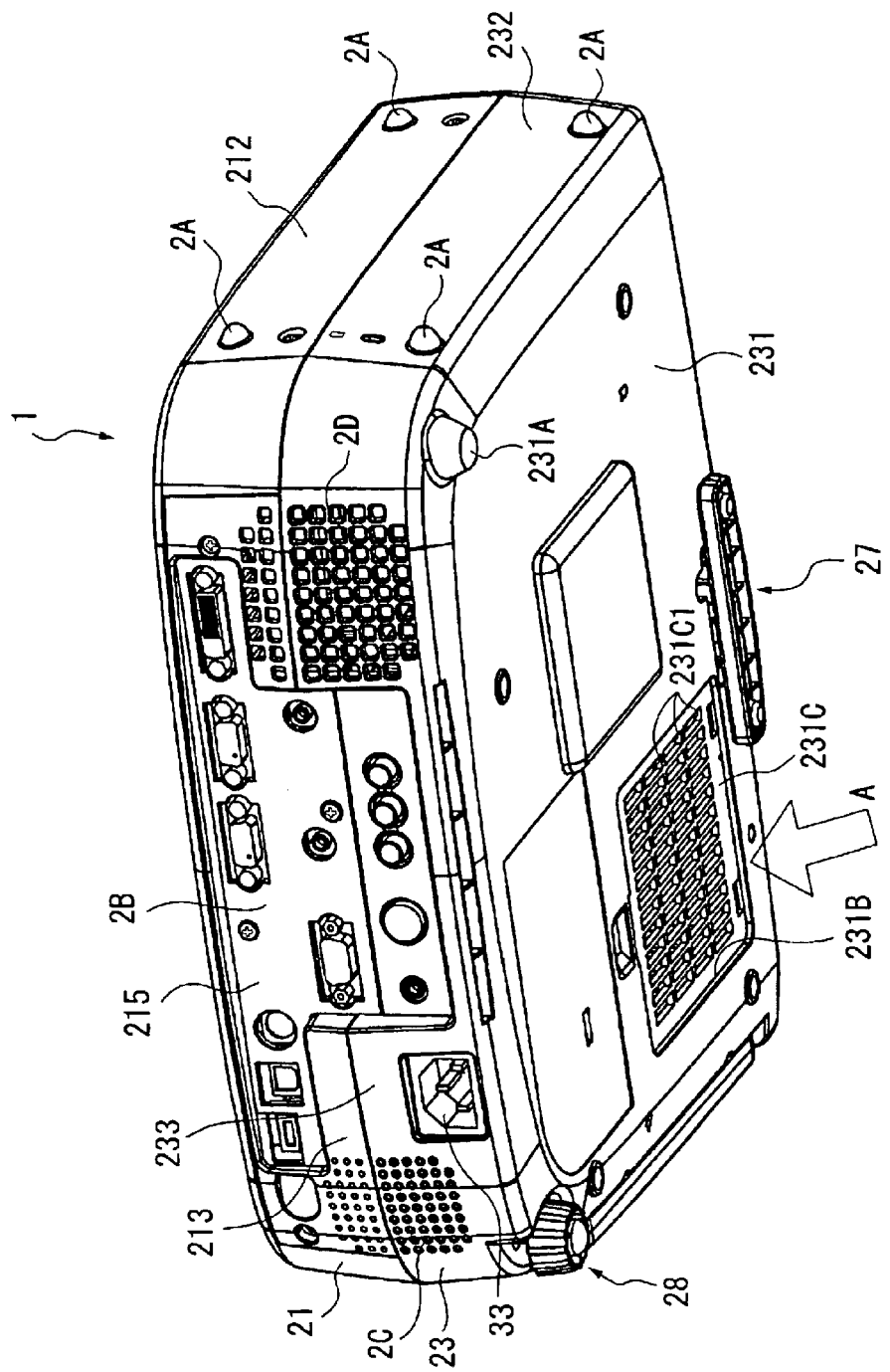
FIG. 2 is an overall perspective view seen from below of the projector.
Figure 3:
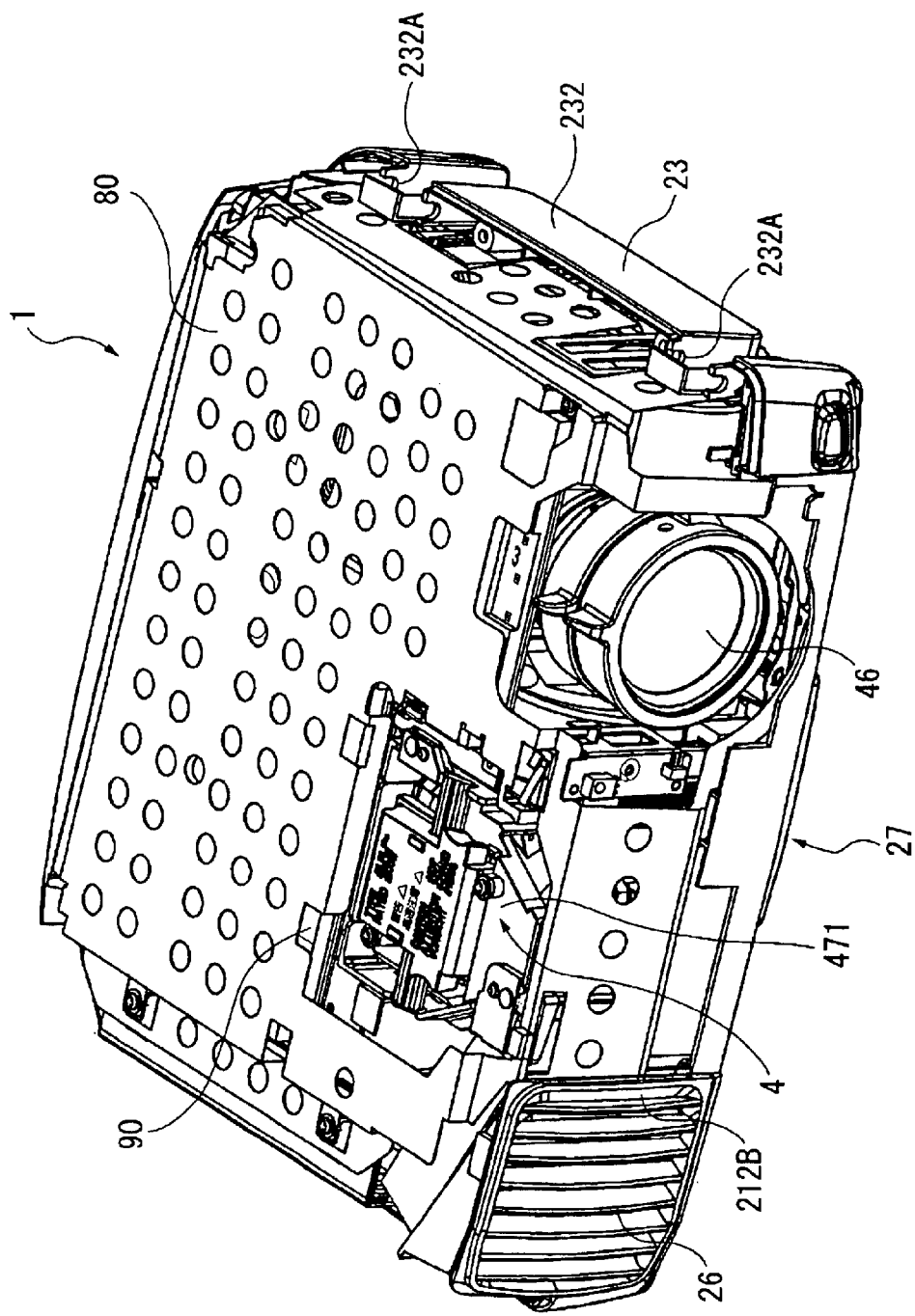
FIG. 3 is a perspective view showing the interior of the projector, and specifically a view of the projector with an upper case removed from the state shown in FIG. 1.
Figure 4:
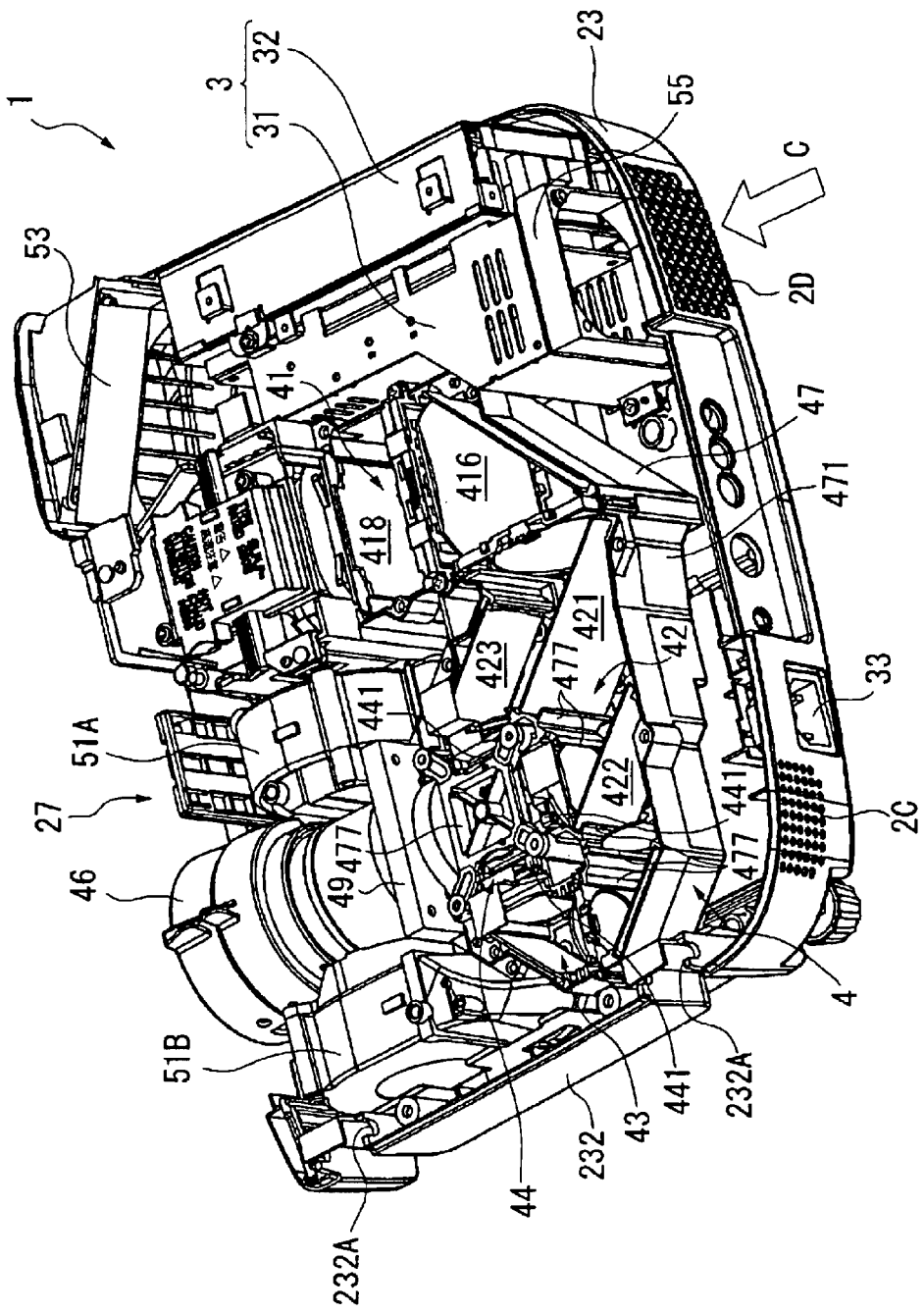
FIG. 4 is a perspective view showing the interior of the projector, and specifically a view seen from the rear side with a shield plate, a driver board and an upper light guide removed from the state shown in FIG. 3.
Figure 5:
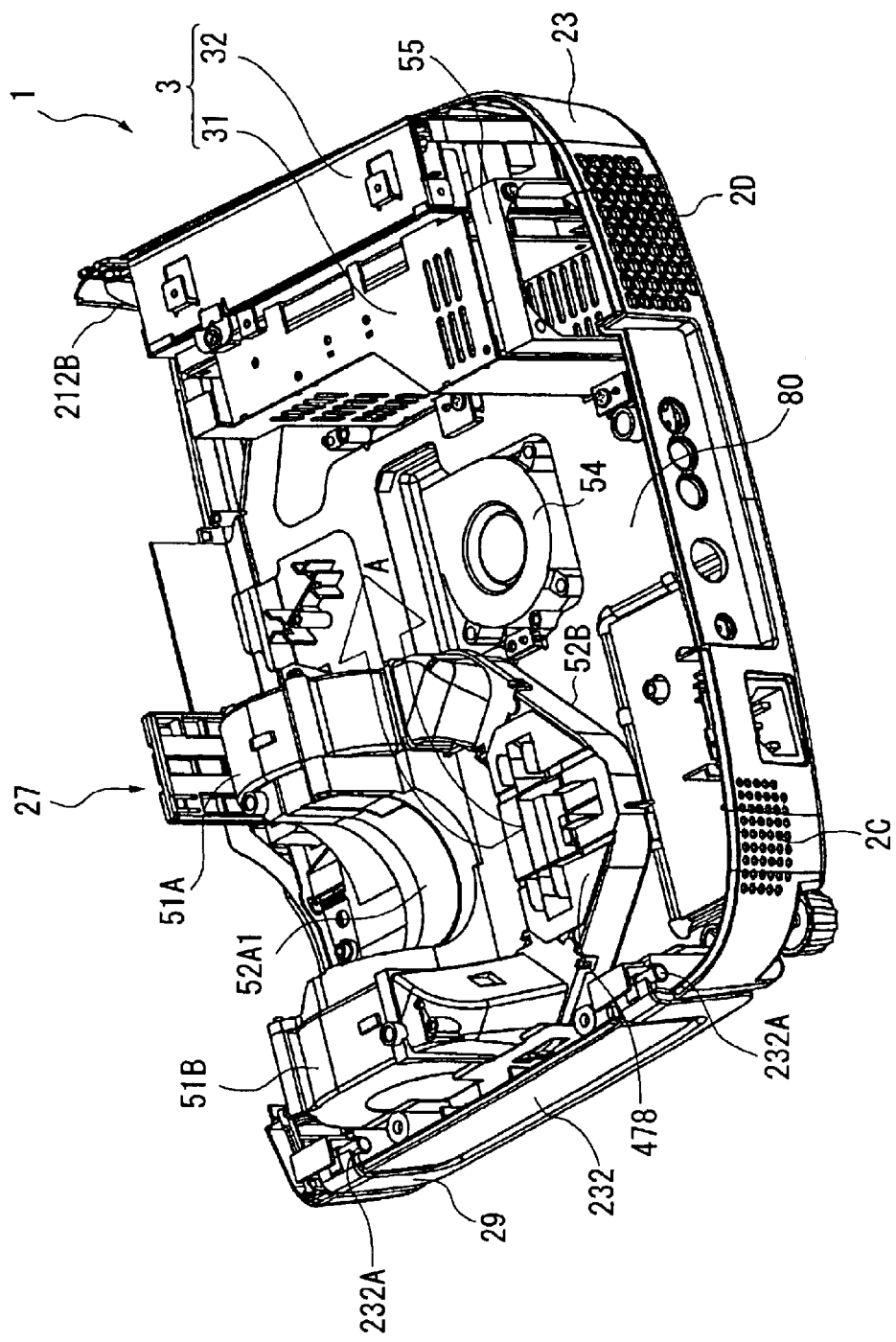
FIG. 5 is a perspective view showing the interior of the projector, and specifically a view with an optical unit removed from the state shown in FIG. 4.

FIG. 1 is an overall perspective view seen from above of a projector 1 according to the present one embodiment, FIG. 2 is an overall perspective view seen from below of the projector 1, and FIGS. 3 to 5 are perspective views showing the interior of the projector 1. Specifically, FIG. 3 is a view of the projector 1 with an upper case 21 removed from the state shown in FIGS. 1, FIG. 4 is a view seen from the rear side with a shield plate 80, a driver board 90 and an upper light guide 472 removed from the state shown in FIG. 3, and FIG. 5 is a view with an optical unit 4 removed from the state shown in FIG. 4. These parts 4, 21, 80, 90, 472 constituting the projector will be described in detail as follows.

In FIGS. 1 to 3, the projector 1 comprises an armored case 2, a power source unit 3 housed in the interior of the armored case 2, and an optical unit 4 which is similarly arranged in the interior of the armored case 2 and has a U shape, and is formed approximately in the shape of a rectangular solid as a whole.

The armored case 2 is constituted by the upper case 21 and a lower case 23 which are made of resin respectively. These cases 21, 23 are fixed mutually by screws.

The upper case 21 is formed of an upper surface portion 211, a side face portion 212 provided on its periphery, a back surface portion 213 and a front surface portion 214.

The forward side of the upper surface portion 211 is detachably mounted with a lamp cover 24 by a fitting system. Further, in the upper surface portion 211, the lateral side of the lamp cover 24 is provided with a notched portion 211A in which the upper surface portion of a projection lens 46 is exposed so that a zooming operation and a focusing operation of the projection lens 46 are able to be operated manually by a lever. The rear side of this notched portion 211A is provided with an operation panel 25.

The front surface portion 214 comprises a round hole opening 212A, which continues to the notched portion 211A of the upper case 21, and the projection lens 46 is arranged corresponding to this round hole opening 212A. In this front surface portion 214, the opposite side to the round hole opening 212A is provided with an exhaust port 212B located at the forward side of the internal power source unit 3, and this exhaust port 212B is provided with an exhaust louver 26 which exhausts a cooling air in the direction deviated from an image projection area, that is, to the left side in FIG. 1 and at the same time serves as a light shielding (the exhaust louver 26 is actually mounted to the lower case 23).

The lower case 23 is formed of a bottom face portion 231, a side face portion 232 provided on its periphery and a back surface portion 233.

The forward side of the bottom face portion 231 is provided with a position adjusting mechanism 27, which adjusts an inclination of the whole projector 1 and positions a projection image. Further, the one corner portion of the rear side of the bottom face portion 231 is provided with another position adjusting mechanism 28 which adjusts the inclination to another direction of the projector 1, and the other corner portion is provided with a rear foot 231A. However, the rear foot 231A is unable to adjust the position. Further, the bottom face portion 231 is provided with a suction port 231B for a cooling air. Further, a cover body 231C, which opens plurality of suction port 231C1, and covers the suction port 231C1 in a lattice form, is detachably provided with the suction port 231B.

The one of the side face portions 232 is provided with mounting portions 232A for rotatably mounting a U letter-shaped handle 29.

In the one of the side surface side of such armored case 2, each of side face portions 212, 232 of the upper case 21 and the lower case 23 is provided with a side foot 2A (FIG. 2) which becomes a leg in the case when the projector 1 is put on end with the handle 29 placed on the upper side.

Further, the back surface side of the armored case 2 is provided with an interface portion 2B which opens by straddling a back surface portion 213 of the upper case 21 and a back surface portion 233 of the lower case 23, and the interior side of this interface portion 2B is provided with an interface cover 215, and further, the interior of the interface cover 215 is arranged with an interface substrate not shown mounted with various connectors. Further, both sides of the interface portion 2B are provided with a speaker hole 2C and suction portion 2D by straddling each of the back surface portions 213, 233. This suction port 2D is located at the rear side of the internal power source unit 3.

The power source unit 3, as shown in FIG. 4, is constituted by a power source 31 and a lamp driving circuit (ballast) 32 located at the lateral side of the power source 31.

The power source 31 is for supplying an electric power supplied through a power source cable to the lamp driving circuit 32, a driver board 90 (FIG. 3) and the like, and comprises an inlet connector 33 (FIG. 2) into which the power source cable is inserted.

The lamp driving circuit 32 supplies the electric power to a light source lamp 411 of an optical unit 4.

Figure 6:
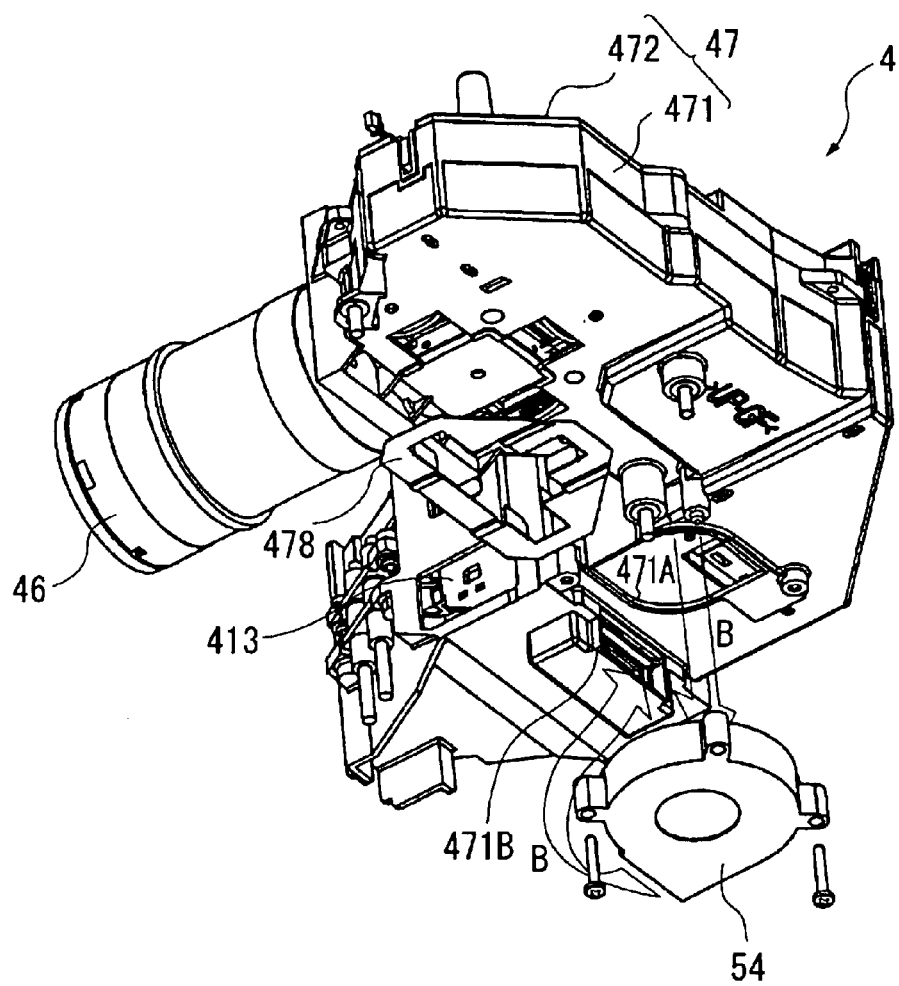
FIG. 6 is a perspective view of the optical unit seen from the underside.
Figure 7:
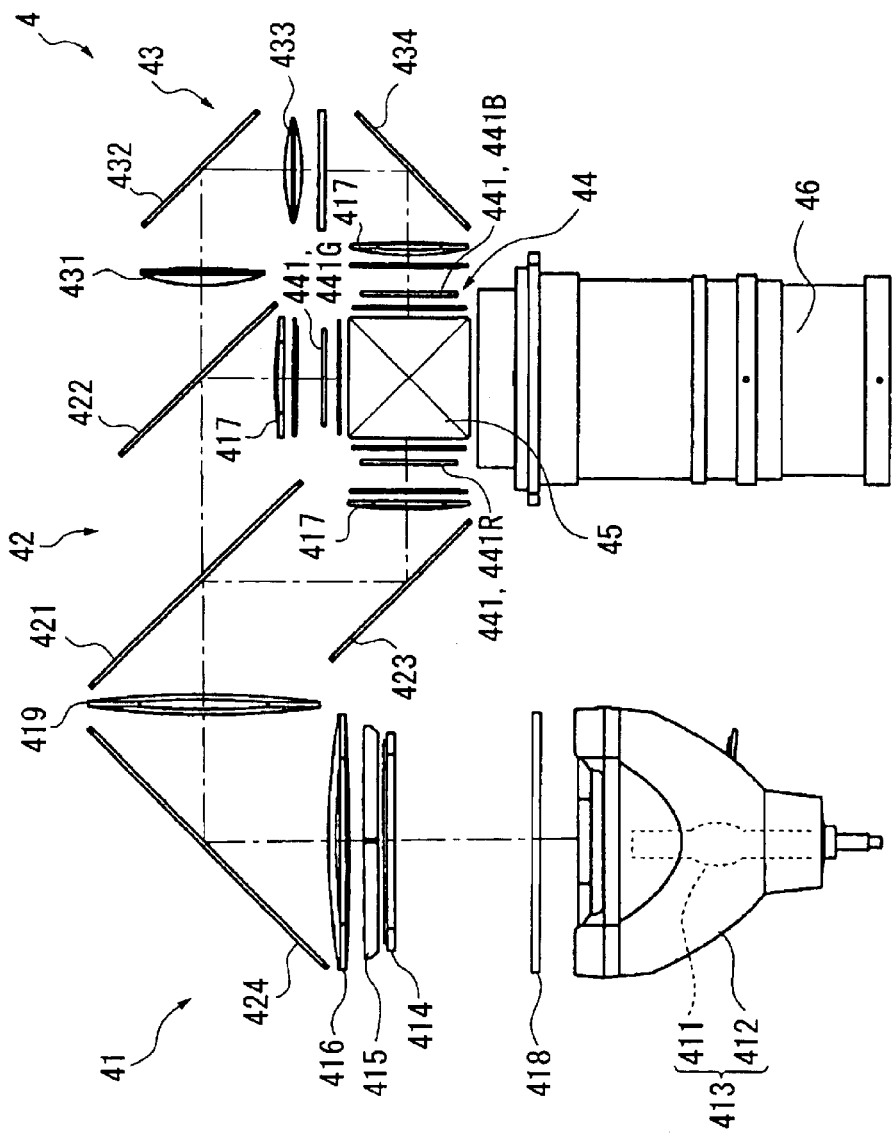
FIG. 7 is a top view schematically showing an optical system of the projector.

The optical unit 4, as shown in FIGS. 4, 6, 7, is an unit for optically processing a light flux emitted from the light source lamp 411 and forming an optical image corresponding to image information, and comprises an integrator illumination optical system 41, a color separation optical system 42, a relay optical system 43, an electro optic device 44, a cross dichroic prism 45 (FIG. 7) as a color synthesizing optical system and a projection lens 46 as a projection optical system.

These power source unit 3 and optical unit 4 are covered with a shield plate 80 (FIGS. 3, 5) made of aluminum, which surrounds the periphery including the top and the bottom and, by this shield plate, a leakage of electromagnetic noises from the power source unit 3 and the like to the outside is prevented.

[2. Detailed Structure of the Optical System]

In FIGS. 4, 7, the integrator illumination optical system 41 is an optical system for almost uniformly illuminating image forming areas of three pieces of the liquid crystal panels 441 (denote the liquid crystal panels 441R, 441G, 441B for each color light of Red, Green, Blue) which constitute the electro optic device 44, and comprises a light source apparatus 413, a first lens array 418, a second lens array 414 including an UV filter, a polarized light conversion element 415, a first condenser lens 416, a reflecting mirror 424 and a second condenser lens 419. Note that the liquid crystal panels 441R, 441G, 441B serve as the electro optic devices even by themselves.

From among them, the light source apparatus 413 has a light source lamp 411 as a radial light source emitting a radial light ray and a reflector 412 for reflecting the radial light emitted from this light source lamp 411. As the light source lamp 411, a halogen lamp, a metal halide lamp or a high pressure mercury lamp are frequently used. As the reflector 412, a parabolic mirror is used. In addition to the parabolic mirror, a parallelized lens (a concave lens) may be used together with an ellipsoidal mirror.

The first lens array 418 has a constitution in which small lenses having approximately a rectangular profile seen from an optical axial direction are placed in a matrix shape. Each small lens divides the light flux emitted from the light source lamp 411 into a plurality of partial light fluxes. The profile shape of each lens is set so as to resemble approximately the same shape as the shape of the image forming area of the liquid crystal panel 441. For example, if an aspect ratio (a ratio of horizontal and vertical dimensions) of the image forming area of the liquid crystal panel 441 is 4:3, then the aspect ratio of each small lens is also set to 4:3.

The second lens array 414 has approximately the same constitution as that of the first lens array 418, and has the constitution in which the small lenses are placed in a shape of a matrix. This second lens array 414 has a function of image-forming an image of each small lens of the first lens array 418 on the liquid crystal panel 441 in conjunction with the first condenser lens 416 and the second condenser lens 419.

The polarized light conversion element 415 is arranged between the second lens array 414 and the first condenser lens 416, and at the same time integrally unitized with the second lens array 414. Such polarized light conversion element 415 converts the light from the second lens array 414 into one kind of a polarized light ray, thereby increasing the use efficiency of the light by the electro optic device 44.

Specifically, each partial light converted into one kind of the polarized light by the polarized light conversion element 415 is finally superposed approximately on the liquid crystal panels 441R, 441G, 441B of the electro optic device 44 by the first condenser lens 416 and the second condenser lens 419. Since the projector using the liquid crystal panel 441 of the type which modulates the polarized light can use only one kind of the polarized light, approximately half of the light from the light source lamp 411 which emits other kinds of random polarized lights is not used.

Hence, by using the polarized light conversion element 415, all the emitted light from the light source lamp 411 is converted into one kind of the polarized light, thereby increasing the use efficiency of the light at the electro optic device 44. Note that such polarized light conversion element 415 is introduced, for example, in Japanese Patent Laid-Open No. 8-304739.

The color separation optical system 42 comprises two pieces of the dichroic mirrors 421, 422 and the reflecting mirror 423, and has a function of separating a plurality of partial light fluxes emitted from the integrator illumination optical system 41 into color lights of three colors of Red, Green, Blue by the dichroic mirrors 421, 422.

The relay optical system 43 comprises an incident side lens 431; a relay lens 433; and reflecting mirrors 432, 434, and has a function of guiding a color light which is a blue color light separated by the color separation optical system 42 to the liquid crystal panel 441B.

At this time, in the dichroic mirror 421 of the color separation optical system 42, a blue color light component and a green color light component of the light fluxes emitted from the integrator illumination optical system 41 are permeated, and at the same time a red color light component is reflected. The red color light reflected by the dichroic mirror 421 is reflected by the reflecting mirror 423, and reaches the liquid crystal panel 441R for the red color by passing through a field lens 417. This field lens 417 converts each partial light flux emitted from the second lens array 414 into a light flux parallel with its center axis (primary light ray). The same is applied to the field lenses 417 provided at the light incident side of the other liquid crystal panels 441G, 441B.

From among the blue color light and the green color light which permeate the dichroic mirror 421, the green color light is reflected by the dichroic mirror 422 and reaches the liquid crystal panel 441G for the green color by passing through the field lens 417. On the other hand, the blue color light permeates the dichroic mirror 422 so as to pass through the relay optical system 43 and, further, passes through the field lens 417 so as to reach the liquid crystal panel 441B for the blue light color. Note that the reason why the relay optical system 43 is used for the blue color light is because, since the length of the optical path of the blue color light is longer than the length of the optical path of other color lights, the deterioration of the use efficiency of the light caused by the diffusion of the light and the like is prevented. That is, this is because the partial light flux incident on the incident side lens 431 is transmitted to the field lens 417 as it is.

The electro optic device 44 comprises three pieces of the liquid crystal panels 441R, 441G, 441B as an optical modulator, and these panels are, for example, a polysilicon TFT as s switching element, and each color light separated by the color separation optical system 42 is modulated according to image information by these three pieces of the liquid crystal panels 441R, 441G, 441B to form an optical image.

The cross dichroic prism 45 forms a color image by synthesizing an modulated image for each color light emitted from three pieces of the liquid crystal panels 441R, 441G, 441B. Note that the cross dichroic prism 45 is formed with a dielectric multi-layer film reflecting the red color light and a dielectric multi-layer film reflecting the blue color light along four interfaces of the rectangular prism approximately in a X letter shape, and three color lights are synthesized by these dielectric multi-layers films. The color image synthesized by the cross dichroic prism 45 is emitted from the projection lens 46 and projected and magnified onto the screen.

Each of the above-described optical systems 41 to 45, as shown in FIGS. 4, 6, is housed in the interior of a light guide 47 made of synthetic resin as the optical unit frame body.

This light guide 47 is constituted by a lower light guide 471 provided respectively with groove portions in which each of the above-described optical elements 414 to 419, 421 to 423, 431 to 434 is inserted respectively from above by a sliding system and a cover-shaped upper light guide 472 which closes an upper portion opening side of the lower light guide 471.

Further, the light emitting side of the light guide 47 is formed with a head portion 49. The forward side of the head portion 49 is fixed with the projection lens 46, and the rear side is fixed with the cross dichroic prism 45 on which the liquid crystal panels 441R, 441G, 441B are mounted.

Note that the material of the light guide 47 is not limited to the synthetic resin, but may be metal. Further, one of the upper and lower light guides 471, 472 may be constituted by the synthetic resin, and the other by metal.

[3. Cooling Structure]

The projector 1 of the present one embodiment comprises a panel cooling system A which is a cooler according to the present invention for mainly cooling the liquid crystal panels 441R, 441G, 441B and a lamp cooling system B for mainly cooling the light source lamp 411 and a power source cooling system C for mainly cooling the power source 31.

In FIGS. 2, 4, 5, the panel cooling system A uses Sirocco fans 51A, 51B as a pair of fans arranged at both sides of the projection lens 46. A cooling air sucked by the Sirocco fans 51A, 51B from the suction port 231B of the undersurface cools the liquid crystal panels 441R, 441G, 441B from below to above and, after that, while cooling the undersurface of the driver board 90 (FIG. 3), is shifted to the axial flow exhaust fan 53 side in the forward corner and exhausted from the exhaust port 212B of the front surface side.

That is, the panel cooling system A as a cooler, as shown in FIGS. 2, 4, 5 and 14 to 17, comprises a pair of blower type Sirocco fans 51A, 51B and a duct 52, in which a pair of these Sirocco fans 51A, 51B is integrally mounted.

The Sirocco fan 51A opens a fan suction hole 51A1 on one end surface of the axial direction, and has a hollow and approximately cylindrical fan case 51A3, which opens a fan exhaust hole 51A2 directed to a tangential direction to the outer peripheral surface. Further, in the interior of the fan case 51A3 are disposed a motor-driven portion 51A4 and a fan wing 51A5 which is integrally mounted to an output axial not shown of this motor-driven portion 51A4 and is rotated by a rotational drive of this output axial. Note that the Sirocco fan 51B similarly comprises a fan case 51B3 which opens a suction hole 51B1 and an exhaust hole 51B2, and a motor-driven portion 51B4 and a fan wing 51B5 disposed in the interior of this fan case 51B3. In other words, the Sirocco fans 51A, 51B are equivalents, that is, equivalents in which shapes and characteristics thereof are the same.

Further, the duct 52 has a suction duct portion 52A and an exhaust duct portion 52B integrated. The suction duct portion 52A is provided with a lens holding portion 52A1 which is bent approximately upward in the shape of a circular arc and holds the projection lens 46. Further, the outer periphery of the lens holding portion 52A1 is provided with a communication tube portion 52A2 approximately in the shape of a quadrangle tube, the axial direction of which is approximately along the upper and lower directions. This communication tube portion 52A2 is engaged with the vicinity of an opening edge of the suction port 231B of which the top end edge is provided in the undersurface of the armored case 2. By engaging this communication tube portion 52A2 with the suction portion 231B, a suction chamber 52A3 which communicates with the suction portion 231B and is defined by the outer peripheral side of the lens holding portion 52A1 and the inner peripheral side of the communication tube portion 52A2 is formed.

Further, the communication tube portions 52A2 is provided respectively with the duct communication holes 52A4 communicating with the suction chamber 52A3 on the surfaces located in the radial direction of the projection lens 46 held by the lens holding portion 52A1, that is, on the surfaces in which both sides of the projection lens 46 are located. A pair of Sirocco fans 51A, 51B is mounted on the communication tube portions 52A2 of the duct 52, for example, by screws 52A5 and the like in a state of each suction hole 51A1, 51B1 of the pair of Sirocco fans 51A, 51B being communicated with the duct communication holes 52A4 of the communication tube portion 52A2. That is, the pair of Sirocco fans 51A, 51B is positioned in the radial direction of the projection lens 46 and mounted in a pair. Note that, since the pair of Sirocco fans is identical, the rotational directions thereof become symmetrical with the projection lens 46 as a center.

Further, the outer peripheral surface of the lens holding portion 52A1 is provided with a rectifying plate 52A6 as a rectifying member having a flat surface along upward and downward directions. This rectifying plate 52A6 divides the suction chamber 52A3 into two blocks along the radial direction of the projection lens 46 held by the lens holding portion 52A1. That is, the suction chamber 52A3 is divided by the rectifying plate 52A6 into a first suction chamber 52A31 communicating with the Sirocco fan 51A and a second suction chamber 52A32 communicating with the Sirocco fan 51B. Note that the first suction chamber 52A31 and the second suction chamber 52A32 have the same air duct resistance.

The suction duct portion 52A is formed with a first suction air duct 52A7 and a second suction air duct 52A8, which run from the suction port 231B of the armored case 2 to each fan suction hole 51A1, 51B1 of each Sirocco fan 51A, 51B.

Further, the exhaust duct portion 52B has a body portion 52B1 having an axial direction to upward and downward directions and formed approximately in the shape of a triangle tube. And this body portion 52B1 is integrally mounted with a rectifying downward pressure plate 52B2 approximately in the shape of a triangle plate with its undersurface closed. Further, the body portion 52B1 is integrally mounted with a rectifying upward pressure plate 478 approximately in the shape of a triangle plate with its upper surface closed. The exhaust duct portion 52B is formed approximately in the shape of a triangle pole by the body portion 52B1, the rectifying downward pressure plate 52B2 and the rectifying upward pressure plate 478.

Further, the upper surface of the rectifying downward pressure plate 52B2 is provided with a rectifying tube portion 52B3 in the shape of a quadrangle tube which is located approximately in the center thereof and having the axial direction to upward and downward directions. Further, the body portion 52B1 is formed with a first exhaust communication hole 52B4, which is opened toward a direction approximately parallel with the axial direction of the lens holding portion 52A1 of the suction duct portion 52A at the other position corresponding to the base angle of the triangle. This first exhaust communication hole 52B4 is communicated with a fan exhaust hole 51A2 of the Sirocco fan 51A.

Further, the body portion 52B1 is formed with a guide duct portion 52B5 having an axial direction approximately along upward and downward directions and located in the other position corresponding to the base angle of the triangle, that is, in the opposite side to the first exhaust communication hole 52B4. The upper end of this guide duct portion 52B5 is formed with a second exhaust communication hole 52B6, which is opened in a direction approximately parallel with the axial direction of the lens holding portion 51A1 of the suction duct portion 52A. This second exhaust communication hole 52B6 is communicated with the fan exhaust hole 51B2 of the Sirocco fan 51B.

Further, the rectifying upward pressure plate 478 is, for example, punched out and formed with an exhaust outflow hole 478A, which is approximately quadrangle-shaped and is able to engage with the upper end of the rectifying tube portion 52B3, and in which the position corresponding to the side other than the suction duct portion 52A side of the rectifying tube portion 52B3 is notched approximately in the shape of a U letter. This exhaust outflow hole and the outer periphery of the rectifying tube portion 52B3 form the exhaust outflow holes 478AB, 478AG, 478AR. These exhaust outflow holes of 478AB, 478AG, 478AR are placed in a position respectively to face on the liquid crystal panels 441B, 441G, 441R of the optical unit in a state of being built into the interior of the armored case 2. Further, the opening edges of the exhaust outflow holes of 478AB, 478AG, 478AR are formed with a pair of raising pieces 478A4, which are cut and raised upward.

Further, the upper surface of the rectifying downward pressure plate 52B2 is provided with a first flow dividing plate 52B7 and a pair of second flow dividing plates 52B8. The first flow dividing plate 52B7 is provided with its flat surface directed to upward and downward directions and along the axial direction of the lens holding portion 52A1 of the suction duct portion 52A, and is provided at the position corresponding to an apex angle of the rectifying downward pressure plate 52B2. By this first flow diving plate 52B7, the exhaust duct portion 52B is formed in a pair with a first exhaust air duct 52B91 in which the fan exhaust hole 51A2 of the Sirocco fan 51A communicates with the exhaust outflow holes 478AG, 478AR through the first exhaust communication hole 52B4 and a second exhaust air duct 52B92 in which the fan exhaust hole 51B2 of the Sirocco fan 51B communicates with the exhaust outflow holes 478AB, 478AG through the second exhaust communication hole 52B6.

Furthermore, the second flow dividing plate 52B8 with its flat surface directed to upward and downward directions and along the opposing direction of the Sirocco fans 51A, 51B is provided at the position to face on the exhaust outflow holes 478AB, 478AR of the rectifying upward pressure plate 478 in the interiors of the first and second exhaust air ducts 52B91 and 52B92. That is, the second flow dividing plate 52B8 inhibits the air flow approximately orthogonal to the flowing direction of the air which circulates in the interiors of the first exhaust air duct 52B91 and the second exhaust air duct 52B92. The state in which this air flow is inhibited is a condition where two third of the air flow flows out from the exhaust outflow holes 478AB, 478AR and the remainder further flows out from the exhaust outflow hole 478AG These first flow dividing plate 52B7 and a pair of second outflow plate 52B8 constitute the flow dividing member.

On the other hand, the lamp cooling system B uses, as shown in FIGS. 4 to 6, a Sirocco fan 54 which is provided in the undersurface of the optical unit 4. The cooling air drawn into the interior of the projector 1 by the Sirocco fan 54 enters the interior of the light guide 47 from the opening portion not shown which is provided in the upper light guide 472 and passes through between the second lens array 414 and the polarized light conversion element 415, both of which are unitized, so as to cool them and, after that, exits from an exhaust side opening 471A of the lower guide light 471, and is sucked by the Sirocco fan 54 and discharged. The discharged cooling air enters again the interior of the light guide 47 from a suction side opening 471B of the lower light guide 471 and enters the interior of the light source apparatus 413 so as to cool the light source lamp 411 and, after that, exits from the light guide 47 and is exhausted from the exhaust port 212B by the axial flow exhaust fan 53.

Further, the power source cooling system C, as shown in FIG. 4, uses an axial flow suction fan 55 provided at the rear side of the power source 31. The cooling air sucked from the suction port 2D of the back surface side of the power source 31 by the axial flow suction fan 55 cools the power source 31 and the lamp driving circuit 32 and, after that, is exhausted from the exhaust port 212B by the axial flow exhaust fan 53 similarly as other cooling systems A, B.

[4. Mounting Structure of the Optical Parts]

Hereinafter, a mounting structure of the liquid crystal panels 441R, 441G, 441B and the dichroic prism 45 will be described in detail with reference to FIG. 8 to FIG. 13.

Figure 8:
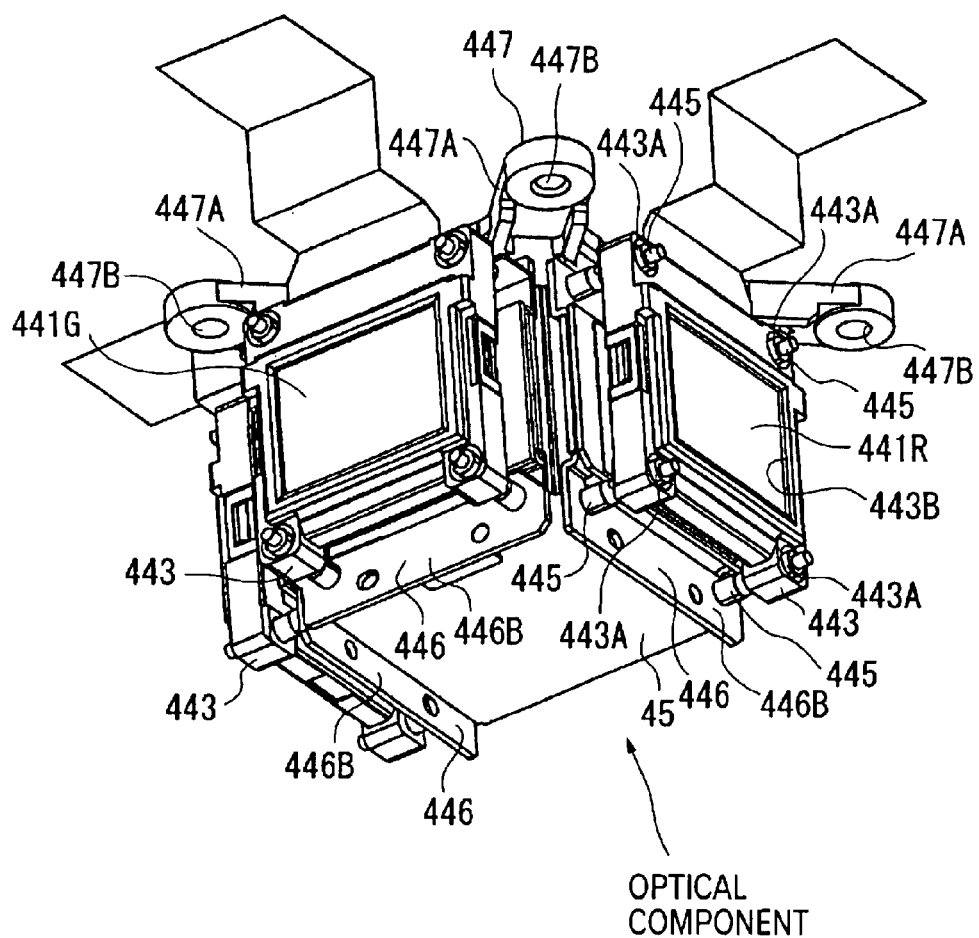
FIG. 8 is a perspective view of an optical part seen from the underside consisting of a liquid crystal panel and a prism mutually integrated.

First, as shown in FIG. 8, each of the liquid crystal panels 441R, 441G, 441B is housed in the interior of a holding frame 443, and a hole 443A formed respectively at the four corner portion of this holding frame 443 is inserted with a pin 445 made of transparent resin together with an UV cure adhesive (fixing to the cross dichroic prism 45 by a so-called POP (panel On Prism) structure) so as to be bonded to a light flux incident plane side which is the side surface of the dichroic prism 45 through a fixing plate 446 made of metal.

Here, the holding frame 443 is formed respectively with a quadrangular opening portion 443B, and each of the liquid crystal panels 441R, 441G, 441B is exposed at the opening portions 443B, and this portion becomes an image forming area. That is, each of the color lights R, G, B is guided to each of the liquid crystal panels 441R, 441G, 441B, thereby forming an optical image according to image information.

The fixing plate 446 is directly fixed to the light flux incident plane of the cross dichroic prism 45 by an adhesive and the like, and its peripheral shape is slightly larger than the light flux incident plane. In the fixing plate 446, a pin 445 is bonded at the part protruded from the light flux incident plane of the cross dichroic prism 45. In this way, even when the cross dichroic prism 45 itself is not made larger than necessary, it is possible to fix the holding frame 443 to the side of the cross dichroic prism 45. This fixing plate 446 is provided with an opening portion 446A (FIG. 12) which corresponds to the opening portion 443B of the holding frame 443 so that the light fluxes from the liquid crystal panels 441R, 441G, 441B are incident on the cross dichroic prism 45.

Figure 9:
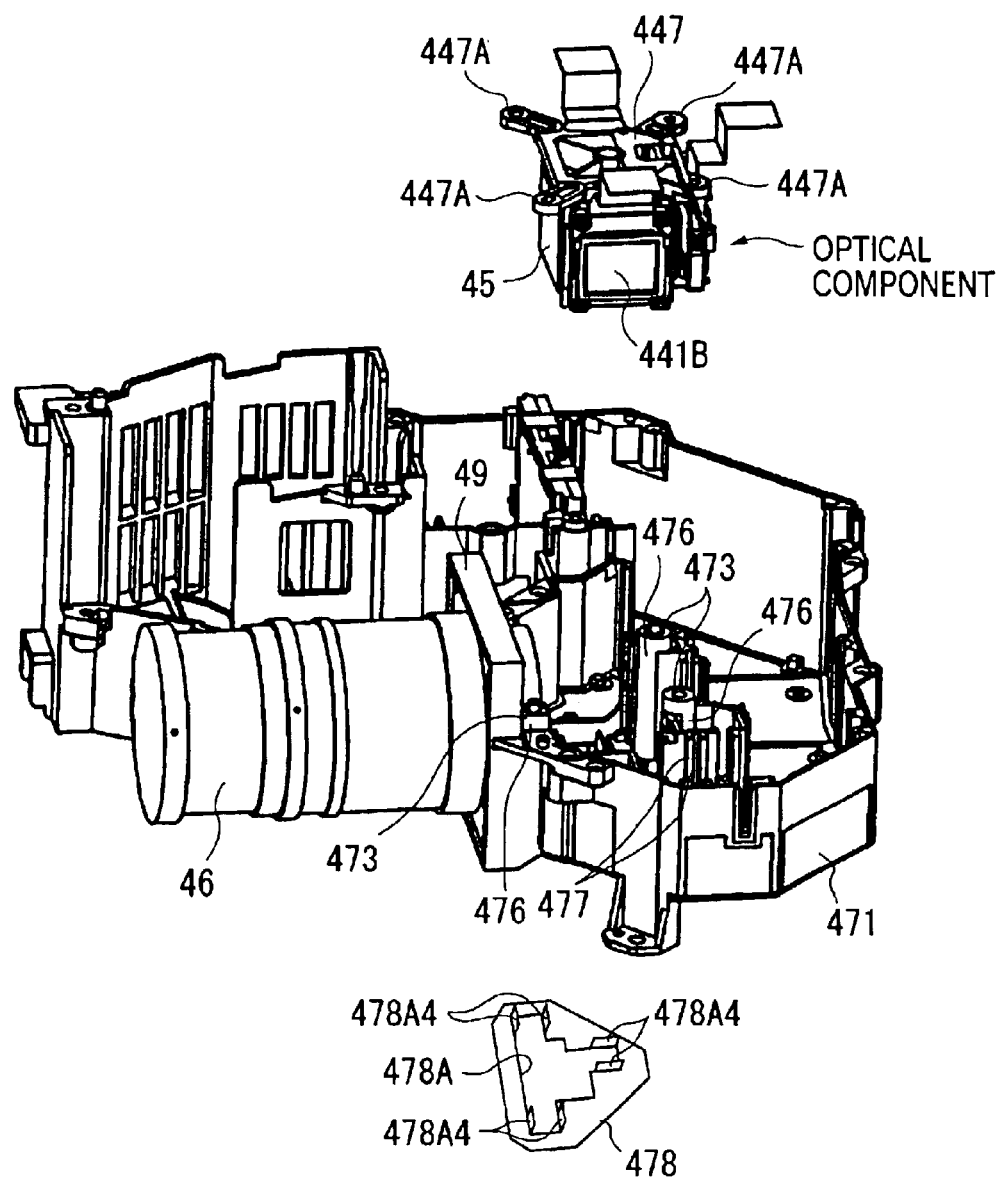
FIG. 9 is a perspective view showing a mounting position of the optical part in a lower light guide.

A prism unit comprising the liquid crystal panels 441R, 441G, 441B and the cross dichroic prism 45 all of which are integrated into the POP structure is, as shown in FIG. 9, fixed to the mounting portions 473 of the lower light guide 471 through mounting members 447 bonded to the upper surface (the surface orthogonal to the light flux incident plane) of the cross dichroic prism 45.

This mounting member 447 seen from a grade level comprises four pieces of an arm portion 447A extended to every four sides and, from among round holes 447B provided to each of the arm portions 447A, two round holes 447B approximately on a diagonal line are fitted into protruding portions 474 (shown also in FIG. 13) for positioning which are provided on the corresponding mounting portions 473, and the remaining two round holes 447B are inserted with screws 475 which are screwed into the corresponding mounting portions 473. Further, the quadrangular portion in the center of the mounting member 447 is provided with an adequate gripping portion enabling the operator to easily grip the same at the time to attach or detach thereof.

Note that a three dimensional position adjustment of the liquid crystal panels 441R, 441G, 441B to the cross dichroic prism 45 is performed in advance in a state of the mounting member 447 being fixed to the cross dichroic prism 45.

On the other hand, the mounting portions 473 of the lower light guide 471 are provided on four boss portions 476 having the shape of a circular cylinder or a rectangular column, which continue approximately to upward and downward directions of the lower light guide 471. Accordingly, in a state of the mounting members 447 being mounted to the mounting portions 473, the liquid crystal panels 441R, 441G, 441B and the cross dichroic prism 45 are arranged in a state of being hanged from the undersurface side of the mounting members 447, and are housed in the interior of the light guide 47 in a state of being slightly floated from the bottom face of the lower light guide 471.

In such lower light guide 471, two boss portions 476 at the projector 46 side are integrally provided with a head portion 49 for fixing the projection lens 46 and, even when the projection lens 46 having a heavy weight is fixed to the head portion 49, the head portion 49 is reinforced by the boss portions 476 so that the head portion 49 is not inclined.

Two boss portions 476 alienated from the projection lens 46 are provided with a plurality of holding pieces 477 (a part of holding pieces 477 is represented and shown in FIGS. 4, 9) along upward and downward directions, and grooves for fitting the field lens 417, the dichroic mirrors 421, 422, the incident side lens 431 and relay lens 433 are formed between a pair of holding pieces 477 adjacent to each other. That is, these holding pieces 477 are also integrally formed with the boss portions 476 so as to be reinforced by the boss portions 476.

Figure 10:
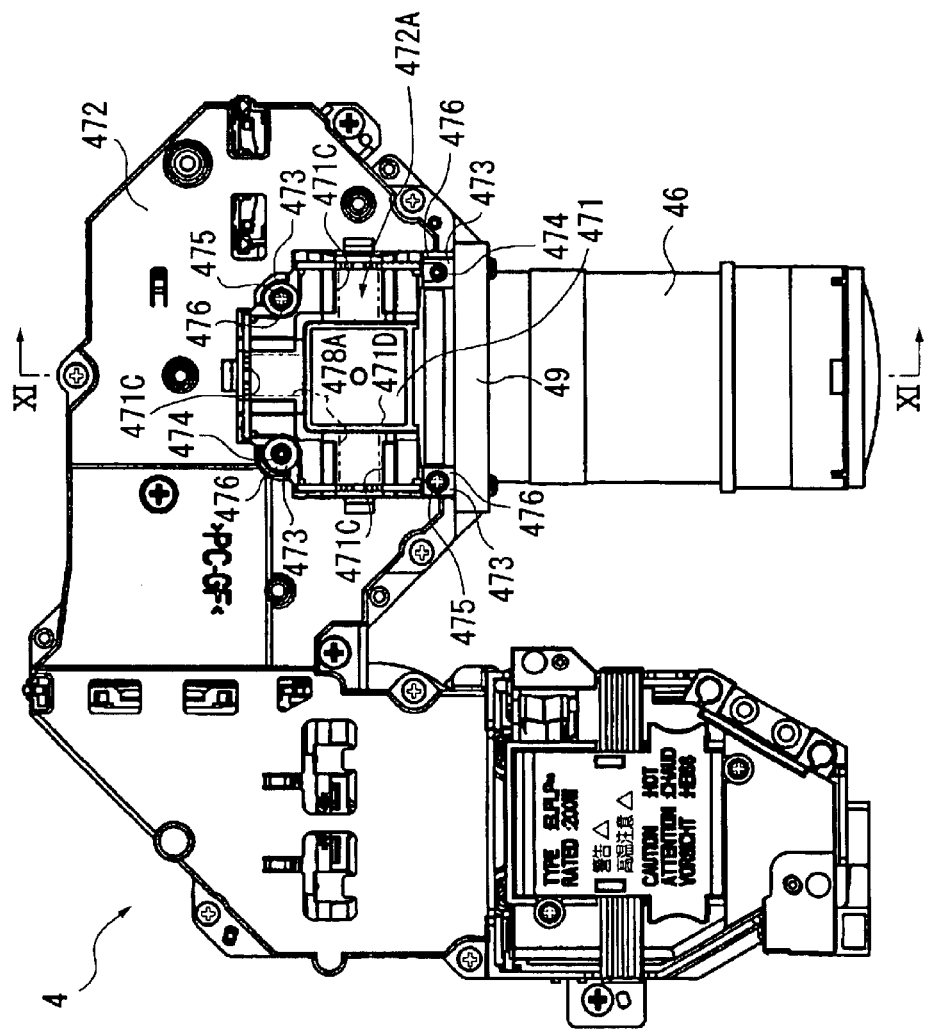
FIG. 10 is a top view showing the optical unit.

Further, as shown in FIGS. 6, 10, the bottom face of the lower light guide 471 is provided with suction side openings 471C at three places corresponding to the liquid crystal panels 441R, 441G, 441B, and the liquid crystal panels 441R, 441G, 441B are cooled by the cooling air in the panel cooling system A (FIGS. 2, 5) flowing from these suction side openings 471C to the interior of the light guide 47.

At this time, the undersurface of the lower light guide 471 is provided with the tabular rectifying upper pressure plate 478 having approximately a triangle shape in its surface and, as shown in FIGS. 9 to 12, a pair of raising pieces 478A4 (a total of six pieces) provided in the rectifying upper pressure plate 478 are protruded upward from the suction side openings 471C. However, in FIG. 10, the raising pieces 478A4 are shown by a two-dot chain line. By these raising pieces 478A4, the flow of the cooling air for cooling the liquid crystal panels 441R, 441G, 441B is adjusted from below to above.

Furthermore, in FIG. 10, from among the peripheral edges of the suction side openings 471C, one peripheral edge at the cross dichroic prism 45 side and parallel with the light flux incident plane is in close proximity to an extended portion 446B in which the periphery of the fixing plate 446 is formed by extending to the downward direction, and this extended portion 446B is arranged along one periphery of the suction side openings 471C so as to serve as a rectifying plate. For this reason, a part of the cooling air of the panel cooling system A is guided to the extended portion 446B, and is allowed to flow into a gap between the liquid crystal panels 441R, 441G, 441B and the cross dichroic prism 45 without leaking from the gap between the bottom face of the lower light guide 471 and the cross dichroic prism 45.

The rear face side of such extended portion 446B (the cross dichroic prism 45 side) is positioned with a rising portion 471D risen from the bottom face of the lower light guide 471, and this rising portion 471D and the extended portion 446B are superposed, thereby making it hard for the cooling air to escape.

On the other hand, the upper light guide 472, as shown in FIG. 10, is provided with notch openings 472A at portions corresponding to the liquid crystal panels 441R, 441, 441B and the dichroic prism 45, and the mounting portions 473 of the lower light guide 471 are also exposed from the notch openings 472A. That is, the liquid crystal panels 441R, 441G, 441B and the cross dichroic prism 45 are fixed in advance to the mounting members 447, so that the mounting members 447 inclusive of all are detachable with respect to the mounting portions 473 even in a state of the upper light guide 472 being mounted to the lower light guide 471.

Figure 11:
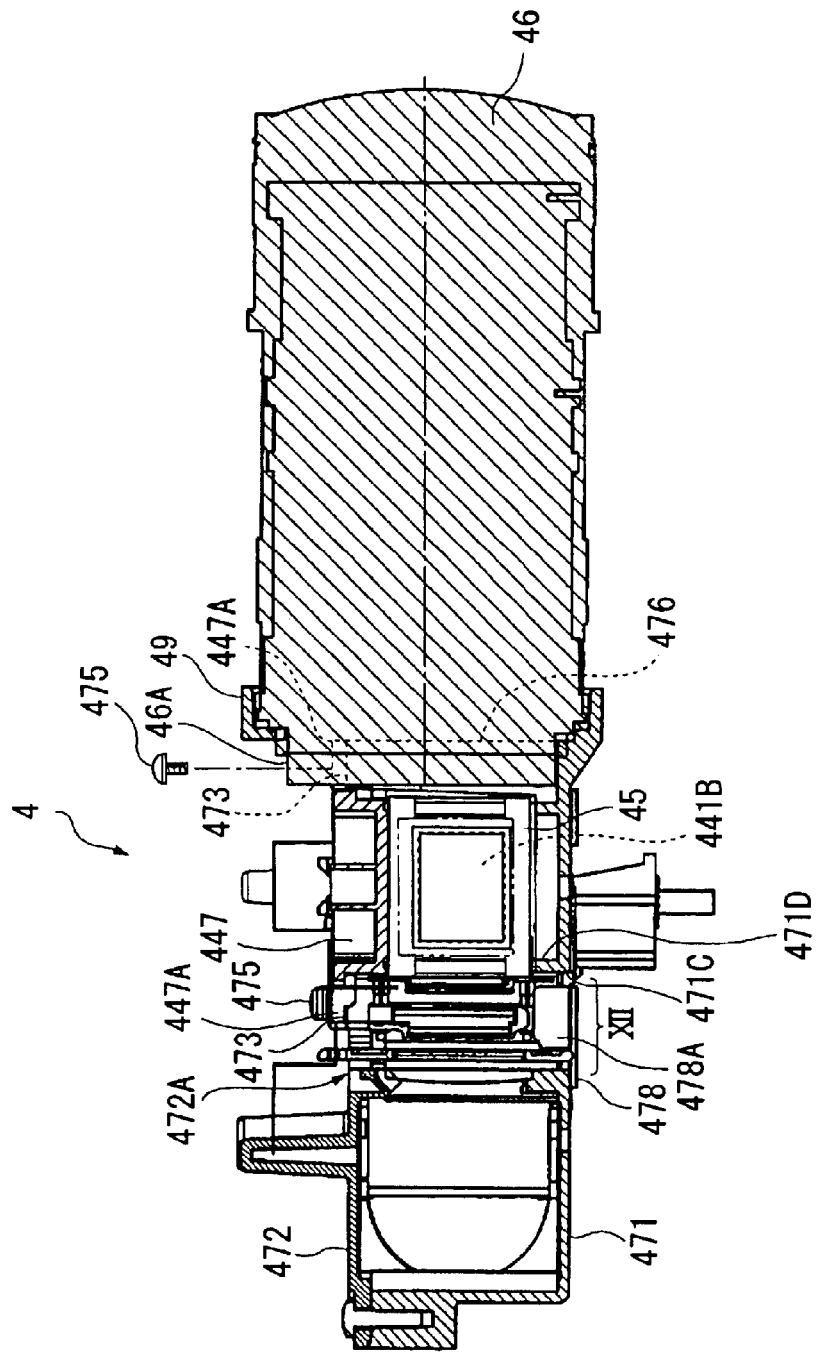
FIG. 11 is a sectional view along the line XI—XI of FIG. 10.
Figure 12:
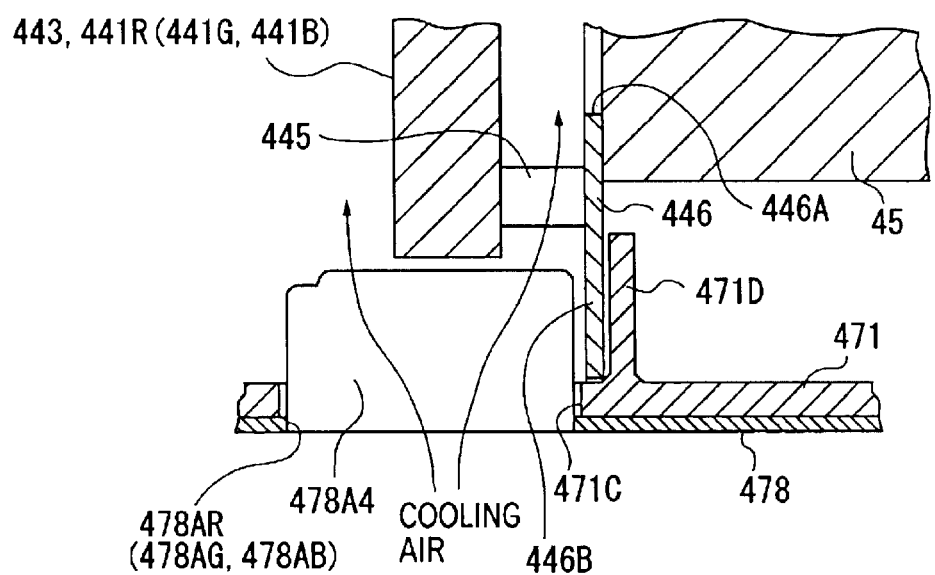
FIG. 12 is an enlarged view of a XII portion shown in FIG. 11.
Figure 13:
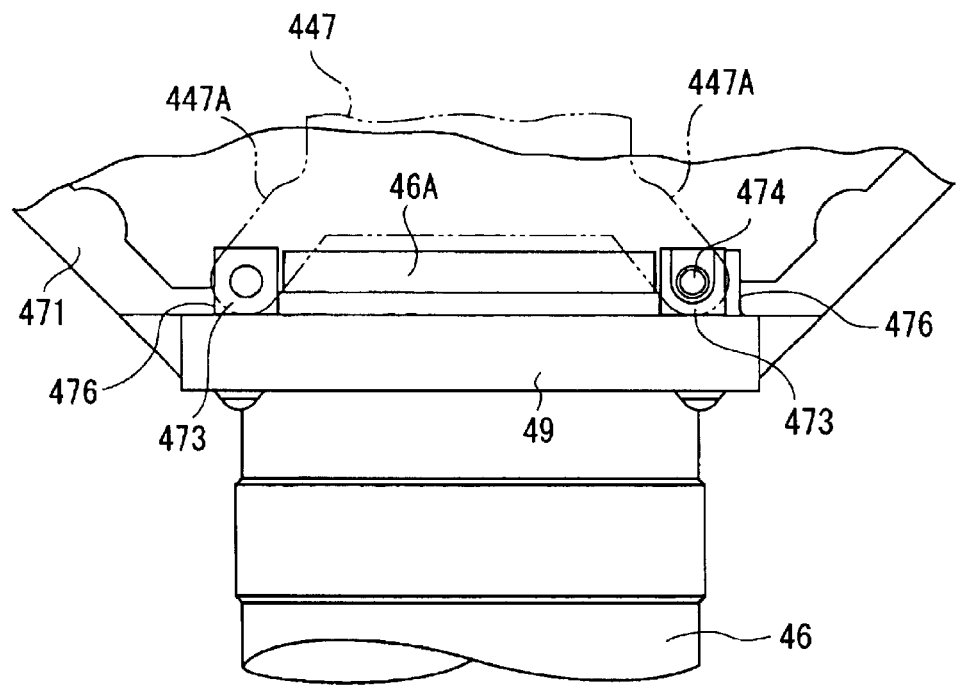
FIG. 13 is an enlarged top view showing an essential portion of the optical unit.
Figure 14:
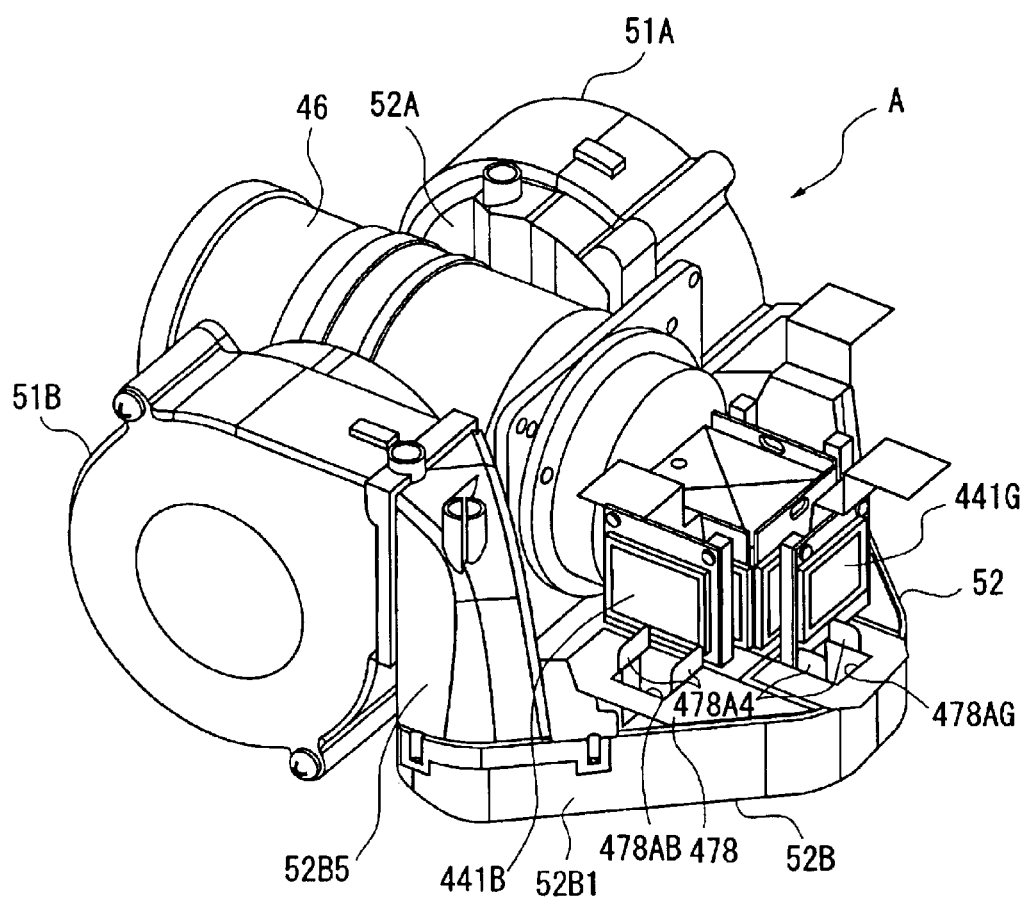
FIG. 14 is a perspective view showing a constitution of a cooling system of the projector.
Figure 15:
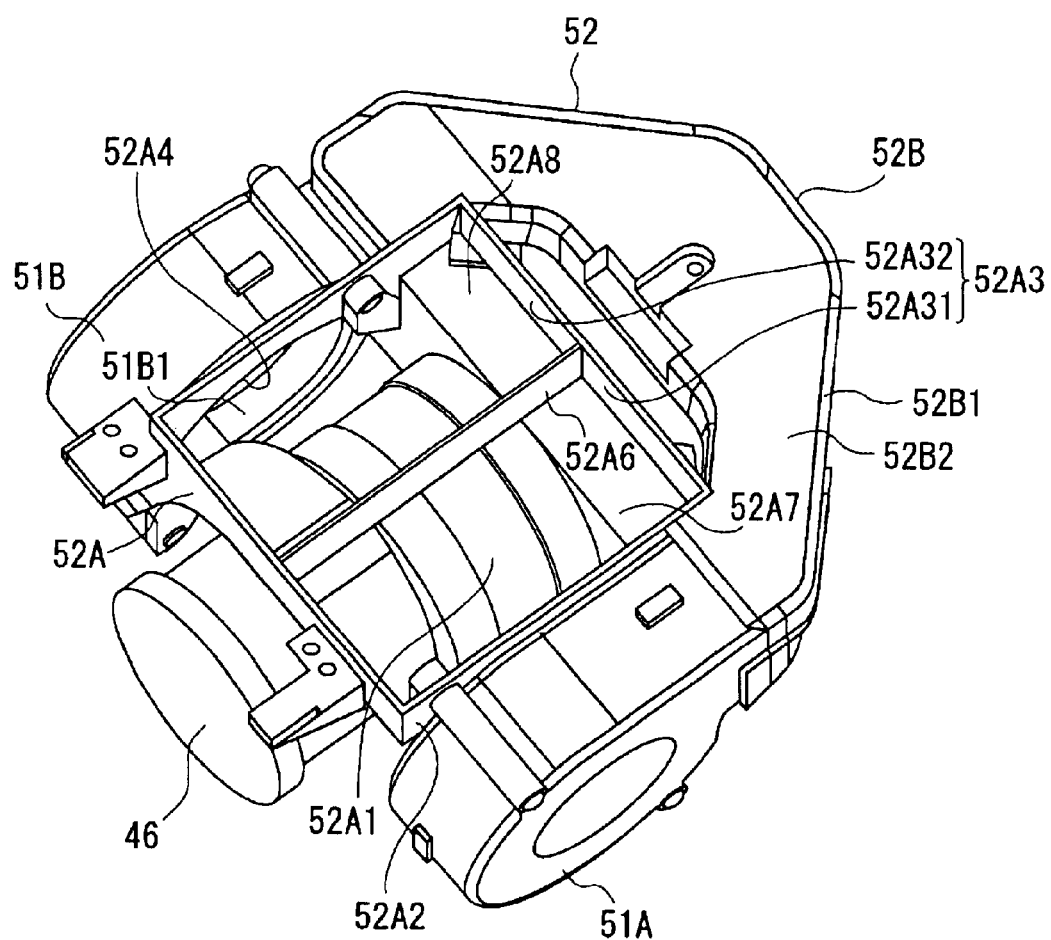
FIG. 15 is a bottom face perspective view showing the constitution of the cooling system of the projector.
Figure 16:
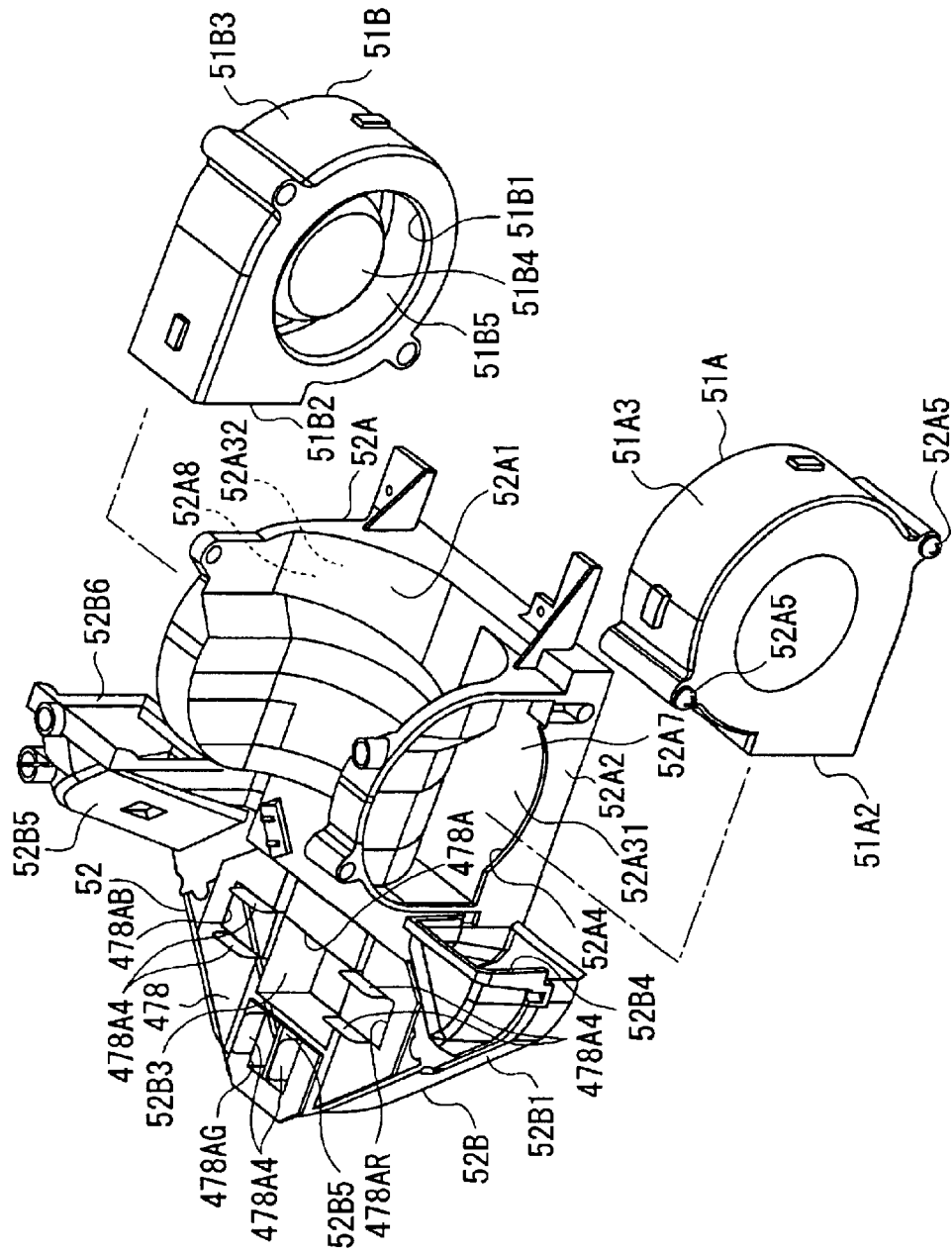
FIG. 16 is an exploded perspective view showing the constitution of the cooling system of the projector.
Figure 17:
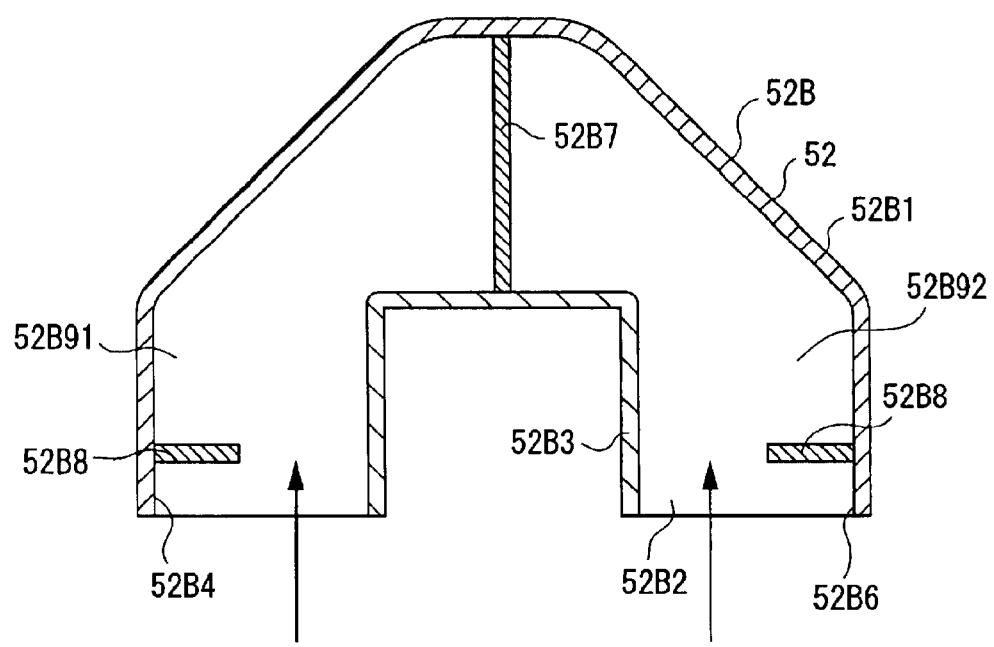
FIG. 17 is a sectional view schematically showing the constitution of a flow dividing member of the cooling system of the projector.

Further, the mounting portions 473 provided in the boss portions 476 integral with the head portion 49 are especially located upper than the center axis X—X of the projection lens 46 shown in FIG. 11. For this reason, as shown in FIG. 13, when seen from a grade level, two pieces of the arm portion 447A of the mounting members 447 are superposed with respect to the outer periphery of the end portion 46A of the projection lens 46 which is protruded from the head portion 49 to the cross dichroic prism 45 side. However, there occurs substantially no mutual interference between the two arm portions 447A.

[5. Cooling Operation of the Electro Optic Device]

Next, a cooling operation of the electro optic device 44 will be described.

First, the Sirocco fans 51A, 51B are driven by being supplied with electric power, that is, the motor-driven portions 51A4, 51B4 are driven so as to rotate the fan wings 51A5, 51B5. By driving these Sirocco fans 51A, 51B, the air in the interior of the fan cases 51A3, 51B3 flows into the exhaust duct portion 52B from the fan exhaust holes 51A2, 51B2, respectively. For this reason, a negative pressure against the atmospheric pressure in the interiors of the fan cases 51A3, 51B3 increases. Moreover, the negative pressure in the interiors of the first suction chamber 52A31 and the second suction chamber 52A32 of the suction duct portion 52A communicating with the fan suction holes 51A1, 51B1 also increases against the atmospheric pressure.

From the suction port 231B of the armored case 2 which communicates with the first suction chamber 52A31 and the second suction chamber 52A32, the air of the outside is sucked through the suction port 231C1 of the cover body 231C. Here, the first suction chamber 52A31 and the second suction chamber 52A32 are divided into two equal parts by the rectifying plate 52A6. From here onward, the air sucked from the suction port 231B is ventilated half and half in the interior of the first suction duct 52A7 and the second suction duct 52A8, and flows into a pair of Sirocco fans 51A, 51B, respectively. That is, the sucked air flows approximately half and half in the interior of the first suction chamber 52A31 and the second suction chamber 52A32 of the suction duct portion 52A, and is sucked into the fan cases 51A3, 51B3 through the duct communication holes 52A4, 52B4 and the fan suction holes 51A1, 51B1.

Furthermore, the air sucked into the fan cases 51A3, 51B3 is exhausted to the first exhaust air duct 52B91 and the second exhaust air duct 52B92 respectively through the first exhaust communication hole 52B4 and the second exhaust communication hole 52B6 of the exhaust duct portion 52B, respectively. The exhaust air, which is exhausted and is ventilated in the interiors of these first exhaust air duct 52B91 and the second exhaust air duct 52B92, is first inhibited in its flow at the second flow dividing plate 52B8. Due to this inhibition of the flow, two third of the flow quantity of each exhaust air flows out upward from the exhaust outflow holes 478AB, 478AR, respectively. Due to the upward outflow of this exhaust air, the exhaust air is blown to the vicinity of the liquid crystal panels 441B, 441R which are located above, and the vicinity of these liquid crystal panels 441B, 441R is cooled particularly.

One third of the air quantity, which is the remainder of the exhaust air, further is ventilated in the interiors of the first exhaust air duct 52B91 and the second exhaust air duct 52B92, and flows out from the exhaust outflow holes 478AG respectively by the first flow dividing plate 52B7. By blowing from each exhaust outflow hole 478AG of the first exhaust air duct 52B91 and the second exhaust air duct 52B92, the exhaust air is unified. By unifying the exhaust air, the total air quantity becomes approximately the same as the air quantity blown from the exhaust outflow holes 478AB, 478AR. The unified exhaust air is blown to the vicinity of the liquid crystal panel 441G, and the vicinity of the liquid crystal panel 441G is cooled particularly.

The exhaust air, after having cooled the prism unit, is ventilated in the interior of the optical unit 4 from above the prism unit, and is exhausted finally from the armored case 2.

[6. Advantages of the Present Embodiment]

According to the present embodiment as described above, the following advantages are available.

(1) By the Sirocco fans 51A, 51B disposed adjacent to the projection lens 46, the air is sucked from the suction port 231B of the undersurface of the armored case 2, and the exhaust air exhausted from the Sirocco fans 51A, 51B is blown to the prism unit through the exhaust duct portion 52B of the duct 52 and cools the prism unit. For this reason, the space around the projection lens 46 difficult to utilize is effectively exploited so that the downsizing can be attempted. By a simple structure to provide the suction port 231B in the undersurface of the armored case 2, the downsizing can be attempted and the productivity can be improved. Moreover, since the suction port 231B is put into a state of being opened downward, for example, the dust in the air is hard to be sucked into the Sirocco fans 51A, 51B from the suction port 231B, and the influences caused by the dust such as the deterioration of a cooling efficiency or the damage of the characteristic of the prism and the like due to the adherence of the dust to the Sirocco fans 51A, 51B, the interior of the duct 52, the prism unit and the like can be prevented.

(2) The exhaust air from a pair of Sirocco fans 51A, 51B adjacent to the projection lens 46 and located in the radial direction of the projection lens 46 is blown to the prism unit through the exhaust duct portion 52B of the duct 52. For this reason, the space around the projection lens 46 difficult to utilize is effectively exploited so that the downsizing can be attempted. Since the air quantity for cooling the prism unit can be sufficiently secured by the pair of Sirocco fans 51A, 51B and the load of the Sirocco fans 51A, 51B can be reduced, a small type of Sirocco fans 51A, 51B can be utilized so that the downsizing can be attempted, and at the same time the reduction in noises by the reduction in the rotational speed can be attempted.

(3) Since the rotational directions of the Sirocco fans 51A, 51B are made symmetrical with the projection lens 46 as a center so that the same fans are used, there exist no directionality when assembling the Sirocco fans 51A, 51B, thereby improving assembling properties.

(4) The armored case 2 which is disposed with the electro optic device 44, the projection lens 46, a pair of Sirocco fans 51A, 51B and the duct 52 is provided with one suction port 231B, which communicates with the suction sides of the pair of Sirocco fans 51A, 51B, respectively. For this reason, even in the case of the constitution comprising a plurality of Sirocco fans 51A, 51B, an air can be sucked by a simple structure provided with one suction port 231B and, in contrast to the case where a plurality of suction ports 231B are provided, the productivity can be improved, and at the same time the deterioration of the strength of the armored case 2 can be prevented.

(5) The suction sides of the pair of Sirocco fans 51A, 51B are provided with the rectifying plate 52A6 as the rectifying member for rectifying each suction quantity sucked by these Sirocco fans approximately for the same quantity. For this reason, it is possible to stably suck the air from the Sirocco fans 51A, 51B respectively, and the load of the Sirocco fans 51A, 51B is stabilized, and the cooling efficiency can be improved, and at the same time the noise can be reduced.

(6) The tabular rectifying plate 52A6 as the rectifying member is provided in a state of being approximately divided in two equal parts with respect to the suction port 231B. For this reason, it is possible to easily rectify each suction quantity sucked by the pair of Sirocco fans 51A, 51B approximately for the same quantity by a simple structure.

(7) In the vicinity of a plurality of incident planes on which color lights R, G, B modulated into a plurality of optical components of the prism unit are incident, that is, in the vicinity of the liquid crystal panels 441R, 441G, 441B which constitute the electro optic device 44, the duct 52 is provided with the flow dividing members for blowing the exhaust air of approximately the same quantity respectively. For this reason, the prism unit can be stably cooled evenly with a stable characteristic of the prism unit obtained, and the stable projection can be performed, thereby forming a good projection image.

(8) The flow dividing member blows two thirds of the air quantity of the exhaust air from the pair of Sirocco fans 51A, 51B to the vicinity of two different liquid crystal panels 441R, 441B in the vicinity of three incident planes of the prism unit which synthesizes three color lights, that is, the liquid crystal panels 441R, 441G, 441B, and unifies and blows the remainder of the air quantity of the exhaust air to the other liquid crystal panel 441G. For this reason, the prism unit can be stably cooled evenly with a stable characteristic of the prism obtained, and the stable projection can be performed, thereby forming a good projection image.

(9) The flow dividing members are constituted by the first flow dividing plate 52B7 which defines the first exhaust air duct 52B91 and the second exhaust air duct 52B92 which ventilate the exhaust air from the pair of Sirocco fans 51A, 51B respectively and a pair of second flow dividing plates 52B8 provided in the interiors of the first exhaust air duct 52B91 and the second exhaust duct 52B9 respectively in a state of inhibiting the flow of the exhaust air. For this reason, the constitution in which the prism unit can be stably cooled evenly can be simplified, thereby improving the productivity.

(10) As the fans, for example, the Sirocco fans 51A, 51B are used, which are high in the wind velocity in contrast to the axial flow fans and the like. For this reason, the cooling efficiency can be improved. Moreover, the small type of fans can be used so that the downsizing of the projector 1 can be attempted.

(11) In the projector 1, the prism unit comprising the liquid crystal panels 441R, 441G, 441B and the cross dichroic prism 45 which are mutually integrated is detachably mounted to the lower light guide 471 through the mounting members 447. At this time, however, since the prism unit is fixed in a state of being hanged from the mounting members 447 and, moreover, the mounting members 447 are mounted to the mounting portions 473 on top of the boss portions 476 which are nearer side of the removing direction than the prism unit, in the case where the prism unit is replaced, it is not necessary to remove screws 475 or insert a driver for fastening them again into the interior of the light guide 47. Accordingly, without worrying about damaging by the driver the field lens 417 and the like housed in the interior of the light guide 47, a replacement work can be easily performed from the upward side of the light guide 47.

(12) Further, since the mounting members 447 are at the near side, when the replacement work is performed, the arm portions 447A of the mounting members 447 which are extended on every side do not even hit against the field lens 417 and the like, and even in this regard, the replacement work can be easily performed.

(13) Since the arm portions 447A of the mounting members 447 are not housed in the interior of the light guide 47, an arrangement space in the vicinity of the liquid crystals 441R, 441G, 441B can be made small, so that the downsizing of the optical unit 4 including the light guide 47 can be realized.

(14) Since the boss portions 476 at the projection lens 46 sides are integrally formed with the head portion 49, the head portion 49 can be reinforced by the boss portions 476, and even when the head portion 49 is made thinner by that much, a falling down due to the fixing of the projection lens 46 can be prevented and yet the downsizing of the light guide 47 as well as the optical unit 4 can be promoted further by the thinning of the head portion 49.

(15) Further, since the holding pieces 477 for holding other optical parts such as the field lens 417, the dichroic mirrors 421, 422, the incident side lens 431, the relay lens 433 and the like can be also reinforced by being integrally provided with the boss portions 476 at the side alienated from the projection lens 46, the thickness of the holding pieces 477 and the surrounding thereof can be made thinner and, even in this regard, the downsizing of the optical unit 4 can be attempted.

(16) Since the mounting portions 473 on the boss portions 476 integrated with the head portion 49 are located at both sides of the radial direction of the projection lens 46 and yet are provided upward (nearer side of the removable direction than the center axis X—X) by being alienated from the center axis X—X of the projection lens 46, in such a state of the mounting members 447 being mounted to the mounting portions 473, the arm portions 447A of the mounting members 447 and the end portion 46A of the projection lens 46 which is protruded by piercing through the head portion 49 are kept out of interference so that the width and the size of each arm portion 447A can be made larger, and the support strength of the liquid crystal panels 441R, 441G, 441B and the cross dichroic prism 45 can be improved.

Further, since the end portion 46A of the projection lens 46 protrudes from the head portion 49 and comes closer to the dichroic prism 45, if a resolution is the same, a projected image can be made much brighter and, on the contrary, if the brightness is the same, the resolution can be improved. Further, a projection distance can be made much shorter.

(17) Since one peripheral edge of the suction side opening 471C provided in the bottom face of the lower light guide 471 is approached to the extended portion 446B of the fixing plate 446 fixed to the cross dichroic prism 45, and this extended portion 446B is arranged along the one peripheral edge of the suction side opening 471C, it is possible to make the extended portion 446B function as the rectifying plate. For this reason, a part of the cooling air of the panel cooling system A is guided to the extended portion 446B, and the cooling air can be reliably flowed into the gap between the liquid crystal panels 441R, 441G, 441B and the cross dichroic prism 45, and the surface of the light emitting side of the liquid crystal panels 441R, 441G, 441B can be particularly effectively cooled.

(18) Further, since the raising pieces 478A4 of the rectifying upper pressure plate 478 are protruded upward from the suction side opening 471C, the cooling air can be reliably guided from below to upper liquid crystal panels 441R, 441G, 441B sides, and the cooling air is prevented from leaking into the interior of the light guide 47 so that the liquid crystal panels 441R, 441G, 441B can be effectively cooled.

(19) Furthermore, since the mounting members 447 are non-existent between the bottom face of the cross dichroic prism 45 and the undersurface of the lower light guide 471, the liquid crystal panels 441R, 441G, 441B can be allowed to come closer to the suction side openings 471C, the cooling efficiency thereof can be improved.

{7. Modifications}

Note that the present invention is not limited to the above-described one embodiment, but includes other constitutions and the like which can achieve the object of the present invention, and the modifications as shown below are also included in the present invention.

That is, though the above-described one embodiment is described by using the Sirocco fans 51A, 51B as the fans, the use of any one of other fans such as the axial flow fans can deal with the invention.

Further, though a pair of Sirocco fans 51A, 51B is disposed, it is possible to dispose one only fan or a plurality of not less than three fans. Moreover, though the fans are disposed in an opposed state along a horizontal direction in the radial direction of the projection lens 46, they may be disposed in such a direction as upward, downward directions and the like in the radial direction of the projection lens 46. Further, though the equivalents are used, the use of the fans of a different specification in which the rotational directions thereof become symmetrical with the projection lens 46 as a center can deal with the invention.

In the case where a pair of Sirocco fans 51A, 51B is used, the suction port 231B may be not provided in the undersurface of the armored case 2. That is, the Sirocco fans may be provided in the upper surface or the side face. Note that the side face rather than the upper surface is preferable because the falling down of the dust is fewer in that case. Moreover, in order to prevent further invasion of the dust, the suction port 231B may be covered by a filter.

Further, the provision of the suction ports 231B by corresponding to the Sirocco fans 51A, 51B respectively may also deal with the invention.

Further, the rectifying member may be not provided. Any of not only the constitution where the tabular rectifying plate 52A6 is used as the rectifying member, but also the constitution where each of the Sirocco fans 51A, 51B is allowed to suck the same quantity of the air respectively can also deal with the invention.

Further, the flow dividing member may be not provided. As the flow diving member, it is not limited to the constitution where the planar first flow dividing plate 52B7 and a pair of second flow dividing plates 52B8 are used. That is, the cooling of a part of the optical unit by an air quantity slighter larger than for the other parts such as cooling any one of the liquid crystal panels 441R, 441G, 441B by the air quantity slightly larger than for the other parts can deal with the invention.

Further, though the electro optic device 44 constituting the optical device is constituted by three types of the liquid crystal panels 441B, 441G, 441R, the constitution comprising not only three panels, but one only liquid crystal panel or a plurality of liquid crystal panels can also deal with the invention.

On the other hand, the fixing plate 446 is provided with the extended portion 446B extending downward, and though this extended portion 446B serves as the rectifying plate, such extended portion 446B may be provided according to circumstances, or may be omitted. In the case where such extended portion 446B is not available, the cooling air can be guided only by the cut and raised portion 471D, which is provided on the bottom face of the lower light guide 471. However, since the leakage of the cooling air can be prevented by the extended portion 446B such as that of the embodiment, it is desirable that the extended portion 446B is provided.

Although the boss portions 476 are provided integral with the head portion 49 and the holding pieces 477, even the case where they are independently provided is also included in the present invention.

Further, the mounting portions according to the present invention are not necessary to be provided on the boss portions 476, but they are provided to the part of the upper end surface of the lower light guide 471 and the like, and the position, the shape and the like where they are provided are random.

Further, the shape of the mounting member 447 is also random, and it is not limited to the shape of the mounting member 447 in the above-described embodiment.

In the above-described embodiment, though the prism unit comprising the liquid crystal panels 441R, 441G, 441B and the cross dichroic prism 45 is constituted such that it is made removable upward and downward together with mounting members 447, in the present invention, the removable direction of such a prism unit is random and a constitution may be such that the near side of the removable direction is provided with the mounting members 447 and the inner side is provided with the prism unit. Accordingly, for example, in the case where the mounting members 447 are provided on the undersurface side of the cross dichroic prism 45, the liquid crystal panels 441R, 441G, 441B and the cross dichroic prism 45 may be constituted such that they may be removed from the undersurface side of the lower light guide 471 inclusive of the mounting members 447.

Further, in the above-described embodiment, though one example only of the projector using three optical modulators is described, the present invention can be applicable also to the projector using one optical modulator, the projector using two optical modulators or the projector using four or more optical modulators.

Further, in the above-described embodiment, though the liquid crystal panel is used as the optical modulator, the optical modulator other than the liquid crystal such as the device using a micro-mirror may be used.

Further, in the above-described embodiment, though the optical modulator of a transmission type where a light incident plane and a light emitting plane are different is used, the optical modulator of a reflection type where the light incident plane and the light emitting plane become the same may be used.

Further, in the above-described embodiment, though an example only of the projector of a front type for performing the projection from the direction observing a screen is described, the present invention is applicable also to the projection of a rear type for performing the projection from the side opposite to the direction observing the screen.

Industrial Availability

The present invention can be used as the cooler for the electro optic device having a light source with a large caloric power such as the projector and the like.

What is claimed is:

1. A cooler for an electro optic device for cooling the electro optic device which modulates a light flux emitted from a light source according to image information and projects the light thus modulated from a projection lens, characterized by comprising:
a case having an opening:
a pair of fans arranged adjacent to the projection lens, the lens being disposed so that suction holes thereof oppose to both sides of the projection lens and sucking a cooling air from the opening; and
a duct for blowing the exhaust air exhausted from these fans to the electro optic device.

2. The cooler for the electro optic device according to claim 1, characterized in that the pair of fans is symmetrical in rotational directions with the projection lens as a center.

3. The cooler for the electro optic device according to claim 1, characterized by comprising a frame body in which the electro optic device, the projection lens, the pair of fans and the duct are disposed, the frame body having one suction port which communicates with suction sides of the pair of fans respectively.

4. The cooler for the electro optic device according to claim 3, characterized in that the suction port communicates with the opening.

5. The cooler for the electro optic device according to claim 1, characterized by comprising rectifying members which are arranged at the suction sides of the pair of fans, and rectifying each suction quantity of the air sucked by these fans for approximately the same quantity.

6. The cooler for the electro optic device according to claim 3, characterized in that the frame body is provided so as to face the suction port, and comprising rectifying plates for rectifying each suction quantity of the air sucked by the pair of fans for approximately the same quantity.

7. The cooler for the electro optic device according to claim 1, characterized in that the electro optic device is provided in plurality, and wherein the duct comprises a flow dividing member for blowing approximately the same quantity of the exhaust air to the plurality of electro optic devices respectively.

8. The cooler for the electro optic device according to claim 1, characterized in that the electro optic device is provided in three types, and wherein the duct comprises the flow diving member which blows two thirds of an air quantity exhausted from the pair of fans respectively to two different electro optic devices from among the electro optic devices and unifies and blows the remainder of the air quantity exhausted from the fans to the other electro optic device from among the electro optic devices.

9. A projector, characterized by comprising: an electro optic device for modulating a light flux emitted from a light source according to image information; a projection lens for projecting the light flux modulated by the electro optic device; and a cooler for cooling the electro optic device;

the cooler being a cooler for the electro optic device according to claim 1.

10. The projector according to claim 9, characterized in that the pair of fans is symmetrical in rotational directions with the projection lens as a center.

11. The projector according to claim 9, characterized by comprising a frame body in which the electro optic device, the projection lens, the pair of fans and the duct are disposed, the frame body having one suction port which communicates with suction sides of the pair of fans respectively.

12. The projector according to claim 11, characterized in that the suction port communicates with the opening.

13. The projector according to claim 11, characterized in that the frame body is provided so as to face the suction port, and comprising rectifying plates for rectifying each suction quantity of the air sucked by the pair of fans for approximately the same quantity.

14. The projector according to claim 9, characterized by comprising rectifying members which are arranged at the suction sides of the pair of fans, and rectifying each suction quantity of the air sucked by these fans for approximately the same quantity.

15. The projector according to claim 9, characterized in that the electro optic device is provided in plurality, and wherein the duct comprises a flow dividing member for blowing approximately the same quantity of the exhaust air to the plurality of electro optic devices respectively.

16. The projector according to claim 9, characterized in that the electro optic device is provided in three types, and wherein the duct comprises the flow dividing member which blows two thirds of an air quantity exhausted from the pair of fans respectively to two different electro optic devices from among the electro optic devices and unifies and blows the remainder of the air quantity exhausted from the fans to the other electro optic device from among the electro optic devices.

17. The projector according to claim 9, further comprising:

a casing body having a suction port; and an approximately U-shaped suction duct for intercommunicating the suction port and the fan, the duct being disposed along the both sides of the projection lens.

18. The cooler for electro optic device according to claim 1, further comprising:

a casing body having a suction port; and an approximately U-shaped suction duct for intercommunicating the suction port and the fan, the duct being disposed along the both sides of the projection lens.

* * * * *